United States Patent
Lee et al.

(10) Patent No.: US 10,129,785 B2
(45) Date of Patent: Nov. 13, 2018

(54) METHOD AND APPARATUS FOR PROCESSING MEDIA TRAFFIC IN MOBILE COMMUNICATION SYSTEM

(71) Applicant: Samsung Electronics Co., Ltd., Suwon-si, Gyeonggi-do (KR)

(72) Inventors: Ji-Cheol Lee, Suwon-si (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 14/190,593

(22) Filed: Feb. 26, 2014

(65) Prior Publication Data
US 2014/0254360 A1    Sep. 11, 2014

(30) Foreign Application Priority Data

Mar. 8, 2013 (KR) .................. 10-2013-0025312
Feb. 24, 2014 (KR) .................. 10-2014-0021452

(51) Int. Cl.
*H04L 29/06* (2006.01)
*H04W 28/02* (2009.01)
*H04L 12/24* (2006.01)

(52) U.S. Cl.
CPC ..... *H04W 28/0268* (2013.01); *H04L 41/0893* (2013.01); *H04L 65/103* (2013.01); *H04L 65/1016* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 6,714,515 B1 | 3/2004 | Marchand | |
| 8,255,551 B2 | 8/2012 | Melnyk et al. | |
| 2004/0087304 A1* | 5/2004 | Buddhikot | H04L 12/2856 455/426.2 |
| 2010/0268836 A1* | 10/2010 | Jabri | H04L 47/38 709/231 |

(Continued)

FOREIGN PATENT DOCUMENTS

CN    102611586 A    7/2012
CN    102907066 A    1/2013

(Continued)

OTHER PUBLICATIONS

3rd Generation Partnership Project; 1-15 Technical Specification Group Services and System Aspects; Policy and charging control architecture (Release 12), 3GPP Standard; 3GPP TS 23.203, 3rd Generation Partnership (3GPP), Mobile Competence Centre, Mar. 5, 2013, pp. 1-183, vol. W12.0.0, Sophia-Antipolis Cedex, France.

(Continued)

*Primary Examiner* — Ayanah George
(74) *Attorney, Agent, or Firm* — Jefferson IP Law, LLP

(57) ABSTRACT

A method for processing media traffic by a Media Processing Function (MPF) entity in a mobile communication system is provided. The method includes installing a media policy when an Internet Protocol Connectivity Access Network (IP-CAN) between a gateway with a Traffic Detection Function (TDF) and a media policy server is established, or an application is detected in the gateway entity with the TDF, and updating the media policy based on a network status after installing the media policy.

78 Claims, 19 Drawing Sheets

(56) References Cited

U.S. PATENT DOCUMENTS

| | | | |
|---|---|---|---|
| 2011/0199903 A1* | 8/2011 | Cuervo | H04M 15/00 370/235 |
| 2012/0014327 A1 | 1/2012 | Montemurro et al. | |
| 2012/0213074 A1 | 8/2012 | Goldfarb et al. | |
| 2012/0220330 A1* | 8/2012 | Goldner | H04L 12/1407 455/517 |
| 2012/0239816 A1 | 9/2012 | Carnero Ros et al. | |
| 2013/0018842 A1* | 1/2013 | Calippe | H04L 67/28 707/609 |
| 2013/0054800 A1 | 2/2013 | Fernandez Alonso et al. | |
| 2013/0246593 A1* | 9/2013 | Bryskin | H04L 45/02 709/223 |
| 2013/0297812 A1 | 11/2013 | Zhou | |

FOREIGN PATENT DOCUMENTS

| | | |
|---|---|---|
| JP | 2008-177858 A | 7/2008 |
| WO | 2011/147466 A1 | 12/2011 |
| WO | 2012/097676 A1 | 7/2012 |

OTHER PUBLICATIONS

3rd Generation Partnership Project; 1-15 Technical Specification Group Core Network and Terminals; IP multimedia call control protocol based on Session Initiation Protocol (SIP) and Session Description Protocol (SDP); Stage 3 (Release 11), 3GPP TS 24.229. 3rd Generation Partnership Project (3GPP), Mobile Competence Centre, Dec. 19, 2012, pp. 1-777, vol. 11.6.0, Sophia-Antipolis Cedex, France.

* cited by examiner

METHOD AND APPARATUS FOR PROCESSING MEDIA TRAFFIC IN MOBILE COMMUNICATION SYSTEM

CROSS-REFERENCE TO RELATED APPLICATION(S)

This application claims the benefit under 35 U.S.C. § 119(a) of a Korean patent application filed on Mar. 8, 2013 in the Korean Intellectual Property Office and assigned Serial number 10-2013-0025312, and of a Korean patent application filed on Feb. 24, 2014 in the Korean Intellectual Property Office and assigned Serial number 10-2014-0021452, the entire disclosure of each of which is hereby incorporated by reference.

TECHNICAL FIELD

The present disclosure relates to a method and an apparatus for processing media traffic in a mobile communication system. More particularly, the present disclosure relates to a method for adaptively processing media traffic based on a network status in a mobile communication system.

BACKGROUND

Generally, a 3rd Generation Partnership Project (3GPP) communication system is called an Evolved Packet System (EPS), and the EPS includes an Evolved Packet Core (EPC) for a connection to other radio access network.

A policy and charging control structure of the EPC supports a Policy and Charging Enforcement Function (PCEF) and a Traffic Detection Function (TDF), and the PCEF and the TDF may be applied based on a subscriber policy.

In the EPC, a TDF entity as an entity which controls a media policy per application or a PCEF with an Application Detection Control (ADC) function (P-GW) entity is standardized.

The TDF entity or the P-GW entity detects application traffic, and transmits information related to the detected application traffic to a Policy and Charging Rules Function (PCRF) server. The PCRF server transmits a subscriber policy for the detected application traffic to the TDF entity or the P-GW entity thereby the TDF entity or the P-GW entity performs a function, such as a gating, a shaping, a redirection, and the like, as a traffic control function for the detected application traffic per application.

In a service provider network, there is an entity which provides a media processing function, such as trans-coding and video pacing for media traffic based on feedback information transmitted from a user equipment. The entity which provides the media processing function is located between the user equipment and an origin server which provides media contents (or a contents server), stops a Transmission Control Protocol (TCP), and predicts an available transmit rate in an available mobile communication network based on the feedback information received from the user equipment. After changing media traffic based on the predicted transmit rate, the entity which provides the media processing function transmits the changed media traffic or performs a function of adjusting a transmit rate of the media traffic.

Recently, mobile video traffic has rapidly increased. Accordingly, there is a need for enhancing a Quality of Experience (QoE) for the mobile video traffic. More specifically, there is a need for a new network structure which may support a media processing function and a policy for the media processing function.

In addition, there is a need for a network structure which may effectively process media by changing parameters for processing the media based on a network status which dynamically changes.

Further, there is a need for a function of processing media based on information related to a network status which dynamically changes, e.g., congestion status information for a base station or an available transmit rate for related traffic.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for processing media traffic in a mobile communication system.

Another aspect of the present disclosure is to provide an apparatus and a method for adaptively processing media traffic based on a network status in a mobile communication system.

Another aspect of the present disclosure is to provide an apparatus and a method for processing media traffic by installing a media policy when an Internet Protocol Connectivity Access Network (IP-CAN) session is established or an application is detected in a mobile communication system.

Another aspect of the present disclosure is to provide an apparatus and a method for processing media traffic by updating a media policy based on a network status in a mobile communication system.

In accordance with an aspect of the present disclosure, a method for processing media traffic by a Media Processing Function (MPF) entity in a mobile communication system is provided. The method includes installing a media policy when an IP-CAN between a gateway with a Traffic Detection Function (TDF) and a media policy server is established, or an application is detected in the gateway entity with the TDF, and updating the media policy based on a network status after installing the media policy.

In accordance with another aspect of the present disclosure, a method for processing media traffic by a media policy server in a mobile communication system is provided. The method includes providing a media policy to an MPF entity when an IP-CAN between the media policy server and a gateway with a TDF is established, or an application is detected in the gateway with the TDF, and providing an updated media policy to the MPF entity based on a network status after providing the media policy.

In accordance with another aspect of the present disclosure, an MPF entity in a mobile communication system is provided. The MPF entity includes a controller configured to install a media policy when an IP-CAN between a gateway with a TDF and a media policy server is established, or an application is detected in the gateway entity with the TDF, and to update the media policy based on a network status after installing the media policy.

In accordance with another aspect of the present disclosure, a media policy server in a mobile communication system is provided. The media policy server includes a transmitter configured to provide a media policy to an MPF entity when an IP-CAN between the media policy server and a gateway with a TDF is established, or an application is detected in the gateway with the TDF, and to provide an updated media policy to the MPF entity based on a network status after providing the media policy.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
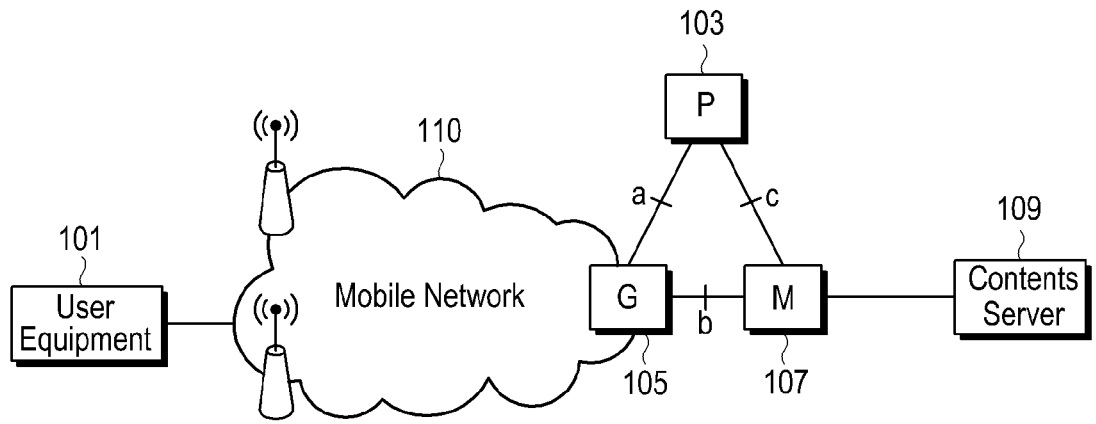
FIG. 1 schematically illustrates a structure of a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although ordinal numbers, such as "first," "second," and so forth will be used to describe various components, those components are not limited herein. The terms are used for distinguishing one component from another component. For example, a first component may be referred to as a second component and similarly, a second component may also be referred to as a first component, without departing from the teaching of the inventive concept. The term "and/or" used herein includes any and all combinations of one or more of the associated listed items.

The terminology used herein is for the purpose of describing various embodiments and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and a method for processing media traffic in a mobile communication system.

An embodiment of the present disclosure proposes an apparatus and a method for adaptively processing media traffic based on a network status in a mobile communication system.

An embodiment of the present disclosure proposes an apparatus and a method for processing media traffic by installing a media policy if an Internet Protocol Connectivity Access Network (IP-CAN) session is established or an application is detected in a mobile communication system.

An embodiment of the present disclosure proposes an apparatus and a method for processing media traffic by updating a media policy based on a network status in a mobile communication system.

A method and an apparatus proposed in various embodiments of the present disclosure may be applied to various communication systems, such as a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) mobile communication system, an Evolved Packet System (EPS), a Mobile Internet Protocol (Mobile IP) system, and/or the like.

An embodiment of the present disclosure proposes a Media Processing Function (MPF) entity as a new network entity, and a network structure where the MPF entity interacts with a Policy and Charging Rules Function (PCRF) server. For example, a media processing may include at least one of a cache and a media adaptation, and the media adaptation may include at least one of trans-coding, trans-rating, and video pacing.

A procedure of processing media traffic in a network structure proposed in an embodiment of the present disclosure will be briefly described.

1) A media policy is installed if an Internet Protocol-Connectivity Access Network (IP-CAN) session is established. The media policy includes a media processing rule which is applicable based on a user equipment or contents, and may include a Media Processing Info Attribute-Value-Pair (AVP) in Table 1.

2) A media policy is controlled per application if a video transmission session, e.g., a Transmission Control Protocol (TCP) session is established.

3) A media policy is adaptively updated based on a change of network status.

4) A media processing usage record is reported if a session is terminated.

A structure of a mobile communication system according to an embodiment of the present disclosure will be described with reference to FIG. 1.

FIG. 1 schematically illustrates a structure of a mobile communication system according to an embodiment of the present disclosure.

Referring to FIG. 1, the mobile communication system includes a user equipment 101, a media policy server (hereinafter, called 'P' or a 'device P') 103, a gateway function entity with a Traffic Detection Function (TDF) 105 (hereinafter, called 'G' or a 'device G'), a media processing function entity 107 (hereinafter, called 'M' or a 'device M'), and a contents server 109. The G 105 is connected to a mobile network 110.

The P 103 is identical to a Policy and Charging Rules Function (PCRF) server in a Policy and Charging Control (PCC) structure of a 3GPP mobile communication system, and controls a policy related to billing. The G 105 is identical to a PCEF with an Application Detection Control (ADC) function (P-GW) entity or a TDF entity in the PCC structure of the 3GPP mobile communication system, detects media traffic, and transfers the detected media traffic to the M 107.

The M 107 is located between the G 105 and the contents server 109. For example, the M 107 is located nearby an Evolved Packet Core (EPC). The M 107 performs a media processing function, such as caching, media adaptation, and the like. Here, the caching denotes that media traffics are temporarily stored for saving a transition cost of a core network side, and the media adaptation denotes that an operation, such as trans-rating, trans-coding, and the like, for media traffic which will be transmitted to a user equipment.

The M 107 performs a TCP proxy function which splits a TCP connection between the user equipment 101 and the contents server 109 in order to optimize the transmission of the media traffic. The contents server 109 is called an origin server, and provides media contents.

The P 103 interacts with the G 105 through an interface a, the G 105 interacts with the M 107 through an interface b, and the M 107 interacts with the P 103 through an interface c.

Attribute-Value-Pairs (AVPs) used in an embodiment of the present disclosure will be described below.

In Table 1, the AVPs used in an embodiment of the present disclosure are expressed with a format of a 'Name of AVP', 'Direction', 'Description', 'When performed'.

TABLE 1

| Name of AVP | Direction | Description | When performed |
|---|---|---|---|
| Media Processing Provisioning Info AVP | P to G | This AVP is used for a P-GW entity with an ADC function or TDF to determine whether a detected session is forwarded to a media processing function or not if the P-GW entity with the ADC function or the P-GW entity detects a subscribed application. | IP-CAN Session Establishment |
| Detected Media Info AVP | G to P | This AVP is used for a PCRF server to determine a media processing policy using a subscribed database (for example, an SPR or a UDR) for a given subscriber and/or a given detected application | Application Start Detection |
| Media Processing Info AVP | P to M (optionally via G) | This AVP is used for a media processing function to perform which type of media processing. This AVP includes a media processing action and parameters of the media processing action. This AVP may include a Media Processing Type AVP indicating which type of media processing is needed. A value of a sub AVP (Media Processing Type) may be one of the following: MP_ACTION_CACHE: cache control MP_ACTION_TRANSCODING: trans-coding/trans-rating MP_ACTION_PACING: video pacing MP_ACTION_TPO: TCP parameter optimization | As a Response of an Application Start Detection (After Application Start Detection) |
| Network Status Change AVP | P to M | This AVP is used for a media processing function to adjust parameters of the media processing function. This AVP includes congestion information, an available bandwidth or a guaranteed bandwidth, and a RAN node identifier, such as an eNB ID, and the like. Example functions are listed as the following: Frame rate, resolution when trans-coding is performed transmitting rate when pacing is performed | Detection of a change of network status is informed to a PCRF server. |
| Media Processing Usage Record | M to P | This AVP includes usage records and statistics information that a media processing function collects for a given session. | At release of a session |

In Table 1, a 'Direction' of the Media Processing Provisioning Info AVP denotes a direction from the P 103 to the G 105, that is, the Media Processing Provisioning Info AVP is transferred from the P 103 to the G 105. The Media Processing Provisioning Info AVP is used to decide whether the G 105 determines to transmit information related to a subscribed application detected in the G 105 to the M 107 if the G 105 detects the subscribed application. The Media Processing Provisioning Info AVP is used for a P-GW entity or a TDF entity to determine whether the subscribed application is forwarded to an MPF entity if the P-GW entity or the TDF entity detects the subscribed application. A 'When performed' of the Media Processing Provisioning Info AVP denotes that the Media Processing Provisioning Info AVP may be performed if an IP-CAN session is established.

In Table 1, a 'Direction' of the Detected Media Info AVP denotes a direction from the G 105 to the P 103, that is, the Detected Media Info AVP is transferred from the G 105 to the P 103. The Detected Media Info AVP is used for a PCRF server to determine a media policy using a data base for a given subscriber and/or a detected application. For example, the Detected Media Info AVP is used for the PCRF server to determine the media policy using a subscriber data base (e.g., Subscriber Policy Repository (SPR)) or a User Data Record (UDR) for the given subscriber and/or the detected application. A 'When performed' of the Detected Media Info AVP denotes that the Detected Media Info AVP may be performed if a start of an application is detected.

In Table 1, a 'Direction' of the Media Processing Info AVP denotes a direction from the P 103 to the M 107, that is, the Media Processing Info AVP is transferred from the P 103 to the M 107. The Media Processing Info AVP is used for a media processing function which performs a type of media processing. The Media Processing Info AVP includes a media processing action and parameters of the Media Processing Info AVP. Specially, the Media Processing Info AVP includes a Media Processing Type AVP indicating which type of media processing is needed.

A value of a sub AVP, i.e., a Media Processing Type may be one of the following:
 MP_ACTION_CACHE: cache control,
 MP_ACTION_TRANSCODING: trans-coding/trans-rating,
 MP_ACTION_PACING: video pacing, and
 MP_ACTION_TPO: TCP parameter optimization.

A 'When performed' of the Media Processing Info AVP denotes that the Media Processing Info AVP may be performed as a response of detection of an application start (after the detection of the application start).

In Table 1, a 'Direction' of the Network Status Change AVP denotes a direction from the P 103 to the M 107, that is, the Network Status Change AVP is transferred from the P 103 to the M 107. The Network Status Change AVP is used for a media processing function which adjusts parameters of the media processing function. The Network Status Change AVP includes an available bandwidth or a guaranteed bandwidth, and a Radio Access Network node identifier, such as an evolved NodeB IDentifier (eNB ID), and the like. The Network Status Change AVP is used for the media processing function to adjust the parameters of the media processing function. Examples of the Network Status Change are listed as the following:

a frame rate and a resolution if trans-coding is performed, and a transmit rate if pacing is performed.

A 'When performed' of the Network Status Change AVP denotes that the Network Status Change AVP may be performed if the detection of the change of the network status is informed to the PCRF server.

In Table 1, a 'Direction' of the Media Processing Usage Record AVP denotes a direction from the M 107 to the P 103, that is, the Media Processing Usage Record AVP is transferred from the M 107 to the P 103. The Media Processing Usage Record AVP includes usage records and statistics information which an MPF entity collects for a given session. A 'When performed' of the Media Processing Usage Record AVP denotes that the Media Processing Usage Record AVP may be performed when a session is released.

A process of processing media traffic according to an embodiment of the present disclosure will be described.

1) Media Policy Installation Per User and Application

If an IP-CAN session establishment is informed to a PCRF server, the PCRF server determines a PCC rule and/or an ADC rule based on subscription policy information, and determines media processing provisioning information for the subscription policy information. The media processing provisioning information includes information on whether a media processing is allowed, and information on which application session among detected applications is applied for the media processing. The detected application session may be identified by TDF-application-identifiers.

If the MPF entity is located apart from a P-GW entity or a TDF entity, the PCRF server determines an MPF entity where a media policy will be implemented.

After determining the media policy and selecting the MPF entity, the PCRF server may install the media processing provisioning information into the MPF entity.

A Media Processing Provisioning Info AVP denoting the media processing provisioning information may include examples in Table 2.

In Table 2, examples of the Media Processing Provisioning Info AVP are described with a format of 'Name of AVP', 'Type', 'Description', 'Example'.

In Table 2, a 'Type' of the Media Processing Allowed AVP is boolean, and the Media Processing Allowed AVP denotes that a user equipment is allowed to use media processing. An 'Example' of the Media Processing Allowed AVP may be 'allowed/disallowed'.

In Table 2, a 'Type' of the Selected MPF ID AVP is an octet string, and the Selected MPF ID AVP denotes a unique identifier for a selected MPF.

In Table 2, a 'Type' of the List of Subscribed Application Identifiers AVP is a list of octet string, and the List of Subscribed Application Identifiers AVP is used for reporting a start or a stop of traffic that a traffic detection function is detected. The List of Subscribed Application Identifiers AVP denotes a list of application identifiers to which the user equipment is subscribed for a media processing or an operator's configuration for which applications are allowed for a requested user equipment. The application identifiers may be used for reporting a start and a stop of the detected traffic. An 'Example' of the List of Subscribed Application Identifiers AVP may be a list of application identifiers where each identifier refers to applications. For example, a value of each identifier may represent an application, such as a list of Uniform Resource Locators (URLs), and the like.

2) Media Policy Control Per Application

If a device G, e.g., a P-GW entity or a TDF entity detects a subscribed application, the device G extracts media information for the subscribed application from application header information.

For example, the media information may be client player information from which a client capability may be extracted, detected media information which will be transferred through a session, or media control information, such as permission of caching a content, validation time of the content, and the like. The device G reports the detected media information to a device P.

Examples of a Detected Media Info AVP denoting the detected media information may be expressed in Table 3.

Examples of the Detected Media Info AVP are described with a format of 'Name of AVP', 'Type', 'Description', 'Example'.

TABLE 2

| Name of AVP | Type | Description | Example |
| --- | --- | --- | --- |
| Media Processing Allowed | Boolean | A user equipment is allowed to use a media processing. | allowed/disallowed |
| Selected MPF ID | Octet String | A unique identifier for a selected media processing function. | |
| List of Subscribed Application Identifiers | List of Octet String | A list of application identifiers which a user equipment is subscribed to for a media processing or an operator's configuration for which applications are allowed for a requested user equipment. The application identifiers will be used for a traffic detection function to report of start and stop of detected traffic. | A list of application identifiers where each identifier refers to applications (e.g., a value of each identifier may represent an application, such as a list of URLs, and the like) |

TABLE 3

| Name of AVP | Type | Description | Example |
| --- | --- | --- | --- |
| Client Player Information | Octet String | This AVP may derive a client player's capability. This AVP may include an operating system name, a version of the operating system name, a browser, or a name of a media player. This AVP can be acquired from HTTP request header information. | Android 2.3 Mozilla |
| Media Information | Octet String | This AVP may include the following information: File Size Media format Video/Audio Codec Encoding Rate Resolution Duration | File Size: 30 MB Media format: flv Video/Audio Codec: H.264 Encoding Rate: 300 Kbps Resolution: 240p Duration: 10 min |
| Cache-Allowed | Boolean | This AVP indicates whether a content of a detected session is allowed to be cached or not. | True or False |
| Cache-Validation-Time | Time | This AVP includes a valid duration since contents are downloaded. Alternatively, this AVP may include absolute time when the contents are valid. After expiration of the absolute time, cached contents may not be transferred outside of a media processing function. | 1 days 1 weeks or 2013 Jan. 23 23:59:59 |

In Table 3, a 'Type' of the Client Player Information AVP is an octet string, and the Client Player Information AVP may derive a capability of client player. The Client Player Information AVP may include an operating system name, a version of the operating system name, a browser, or a name of a media player. The Client Player Information AVP may be acquired from Hyper Text Transfer Protocol (HTTP) request header information. An 'Example' of the Client Player Information AVP may be Android 2.3 and Mozilla.

In Table 3, a 'Type' of the Media Information AVP is an octet string, and the Media Information AVP includes at least one of a file size, a media format, a video/audio codec, an encoding rate, a resolution, and duration. An 'Example' of the Media Information AVP may be 'file size: 30 MB, media format: fly, video/audio codec: H.264, encoding rate: 300 Kbps, resolution: 240p, duration: 10 min'.

In Table 3, a 'Type' of the Cache-Allowed AVP is boolean, and the Cache-Allowed AVP indicates whether a content of a detected session is allowed to be cached or not. An 'Example' of the Cache-Allowed AVP may be 'True' or 'False'.

In Table 3, a 'Type' of the Cache-Validation-Time AVP is Time, and the Cache-Validation-Time AVP includes valid duration since contents are downloaded. The Cache-Validation-Time AVP may include absolute time when the contents are valid. After expiration of the time indicated by the Cache-Validation-Time AVP, the cached contents may not be transferred outside of a media processing function. An Example of the Cache-Validation-Time AVP may be '1 days 1 weeks' or '2013-01-23 23:59:59'.

After receiving the report of the detected session from the device G, the device P determines whether the detected session needs the media processing and an identifier of a media processing function, and which type of media processing action will be undertaken. The media processing action may include one of 'Contents of a detected session can be cached', 'Cached contents of a detected session can be transferred', 'Transcoding for contents of a detected session', 'Transmit rate adaptation of a detected session', and 'TCP parameter optimization'.

After determining the media processing policy and the parameters of the media processing policy, the device P transmits media processing information to the device M.

Examples of a Network Status Change AVP denoting the media processing information may be expressed in Table 4.

Examples of the Media Processing Info AVP are described with a format of 'Name of AVP', 'Type', 'Description', 'Example'.

TABLE 4

| Name of AVP | Type | Description | Example |
| --- | --- | --- | --- |
| Media Processing Indicator | Boolean | This AVP denotes whether a detected session needs a media processing. If there is this AVP, a P-GW entity or a TDF entity may forward traffic with a selected media processing function. | True or False |
| Selected MPF ID | Octet String | This AVP for a selected media processing function which a P-GW entity or a TDF entity may forward to. | IP address or domain name |
| Application Instance Identifier | Octet String | This AVP denotes an assigned identifier by a P-GW entity in order to allow correlation of an application start | Detected-youtube-session-123 |

TABLE 4-continued

| Name of AVP | Type | Description | Example |
|---|---|---|---|
| Media Processing Action AVP | Compound | event and an application stop event for a specific service data flow description. This AVP includes a media processing action and parameters of the media processing action. This AVP may include a Media Processing Type AVP indicating which type of media processing is needed. A value of a sub AVP (Media Processing Type) may be one of the following: MP_ACTION_CACHE: cache control MP_ACTION_TRANSCODING: trans-coding/trans-rating MP_ACTION_PACING: video pacing MP_ACTION_TPO: TCP parameter optimization | |

In Table 4, a 'Type' of the Media Processing Indicator AVP is boolean, and the Media Processing Indicator AVP denotes whether a detected session needs a media processing. If there is the Media Processing Indicator AVP, a P-GW entity or a TDF entity may forward traffic with a selected media processing function. An 'Example' of the Media Processing Indicator AVP may be 'True' or 'False'.

In Table 4, a 'Type' of the Selected MPF ID AVP is an octet string, and the Selected MPF ID AVP denotes an identifier of a selected media processing function which a P-GW entity or a TDF entity may forward. An 'Example' of the Selected MPF ID AVP may be an IP address or a domain name.

In Table 4, a 'Type' of the Application Instance Identifier AVP is an octet string, and the Application Instance Identifier AVP denotes an assigned identifier by a P-GW entity in order to allow correlation of an application start event and an application stop event for a specific service data flow description. Here, an 'Example' of the Application Instance Identifier AVP may be 'Detected-youtube-session-123'.

In Table 4, a Type of the Media Processing Action AVP is compound, and the Media Processing Action AVP includes a media processing action and parameters of the media processing action. The Media Processing Action AVP includes a Media Processing Type AVP indicating which type of media processing is needed. A value of a sub AVP (Media Processing Type) may be one of an MP_ACTION_ CACHE indicating a cache control, an MP_ACTION_ TRANSCODING indicating trans-coding/trans-rating, an MP_ACTION_PACING indicating video pacing, and an MP_ACTION_TPO indicating TCP parameter optimization.

3) Media Policy Update Based on a Change of Network Status

If a network status changes based on Radio Access Network (RAN) status, such as a congestion occurrence, a congestion occurrence change, and the like, and a change of a bandwidth used for a given connection, network status information is notified to a device G or a network entity which is not included in a structure of a mobile communication system according to an embodiment of the present disclosure.

If the device G receives a notification of the change of the network status, the device G reports network status information indicating the change of the network status to a device P, e.g., a PCRF server. The network status information includes a congestion occurrence or a congestion level, available bandwidth information, or an identifier of a RAN node, e.g., an eNB ID.

Examples of a Network Status Change AVP may be expressed in Table 5.

The examples of the Network Status Change AVP are described with a format of 'Name of AVP', 'Type', 'Description', 'Example'.

TABLE 5

| Name of AVP | Type | Description | Example |
|---|---|---|---|
| Congestion Info | Octet String | This AVP indicates congestion information. | 1, 2, 3 |
| Available Bandwidth | Octet String | This AVP indicates an available bandwidth. | |
| eNB Identifier | Octet String | This AVP indicates a globally unique identifier of an eNB to which a given user equipment is connected. | |

In Table 5, a 'Type' of the Congestion Info AVP is an octet string, and the Congestion Info AVP indicates congestion information, Here, an 'Example' of the Congestion Info AVP may be '1,2,3'.

In Table 5, a Type of the Available Bandwidth AVP is an octet string, and the Available Bandwidth AVP indicates an available bandwidth.

In Table 5, a Type of the eNB Identifier AVP is an octet string, and the eNB Identifier AVP indicates a globally unique identifier of an eNB to which a user equipment is connected.

Upon receiving network status information, a PCRF server may re-determine a media policy, and update media processing information, such as a trans-coding parameter including a frame rate, a resolution, a frame-dropping rate, a transmit rate, TCP parameters, and the like.

If the device P (PCRF server) determines to change the media processing information, the device P (PCRF server) transmits the updated media processing information to the device M, e.g., an MPF entity.

4) Media Processing Usage Record Report

A device M may collect session information and media processing usage information as well as traffic usage information while a given session is maintained. The device M reports collected information, i.e., media processing usage records to a device P if the given session is released.

Examples of the Media Processing Usage Record AVP denoting the media processing usage records may be expressed in Table 6. In Table 6, the examples of the Media Processing Usage Record AVP are described with a format of 'Name of AVP', 'Type', 'Description', 'Example'.

TABLE 6

| Name of AVP | Type | Description | Example |
| --- | --- | --- | --- |
| Session-Information | Octet String | This AVP includes session information, origin server information, a source address, a destination address, and ports. | 1, 2, 3 |
| Media-Processing-Usage-Information | Octet String | This AVP includes a type of a media processing action and parameters of the media processing action. | |
| Traffic-Usage-Information | Octet String | This AVP includes an octet count sent to a user equipment. This AVP includes an octet received from an original server. | |

In Table 6, a 'Type' of the Session-Information AVP is an octet string, and the Session-Information AVP includes session information, origin server information, a source address, a destination address, and ports. An 'Example' of the Session-Information AVP may be '1,2,3'.

In Table 6, a 'Type' of the Media-Processing-Usage-Information AVP is an octet string, and the Media-Processing-Usage-Information AVP includes a type of media processing action, and parameters of the media processing action.

In Table 6, a 'Type' of the Traffic-Usage-Information AVP is an octet string, and the Traffic-Usage-Information AVP includes an octet count transmitted to a user equipment.

A method and an apparatus for processing media traffic proposed in the present disclosure will be described with reference to four embodiments of the present disclosure.

Figure 2:
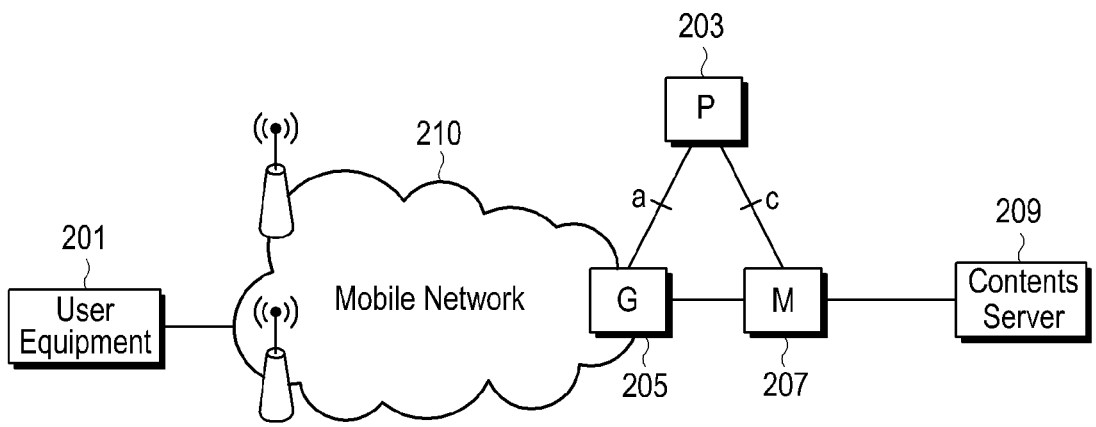
FIG. 2 schematically illustrates a structure of a mobile communication system according to a first embodiment of the present disclosure.

FIG. 2 schematically illustrates a structure of a mobile communication system according to a first embodiment of the present disclosure.

Referring to FIG. 2, the mobile communication system includes a user equipment 201, a P 203, a G 205, an M 207, and a contents server 209. The G 205 is connected to a mobile network 210. A function of each entity included in the mobile communication system has been described with reference to FIG. 1 and a description thereof will be omitted herein.

The M 207 is located apart from the G 205, the P 203 interacts with the G 205 through an interface a, and the P 203 interacts with the M 207 through an interface c.

A structure of a mobile communication system according to the first embodiment of the present disclosure has been described with reference to FIG. 2, and a process of establishing an IP-CAN session in a mobile communication system according to the first embodiment of the present disclosure will be described with reference to FIG. 3.

Figure 3:
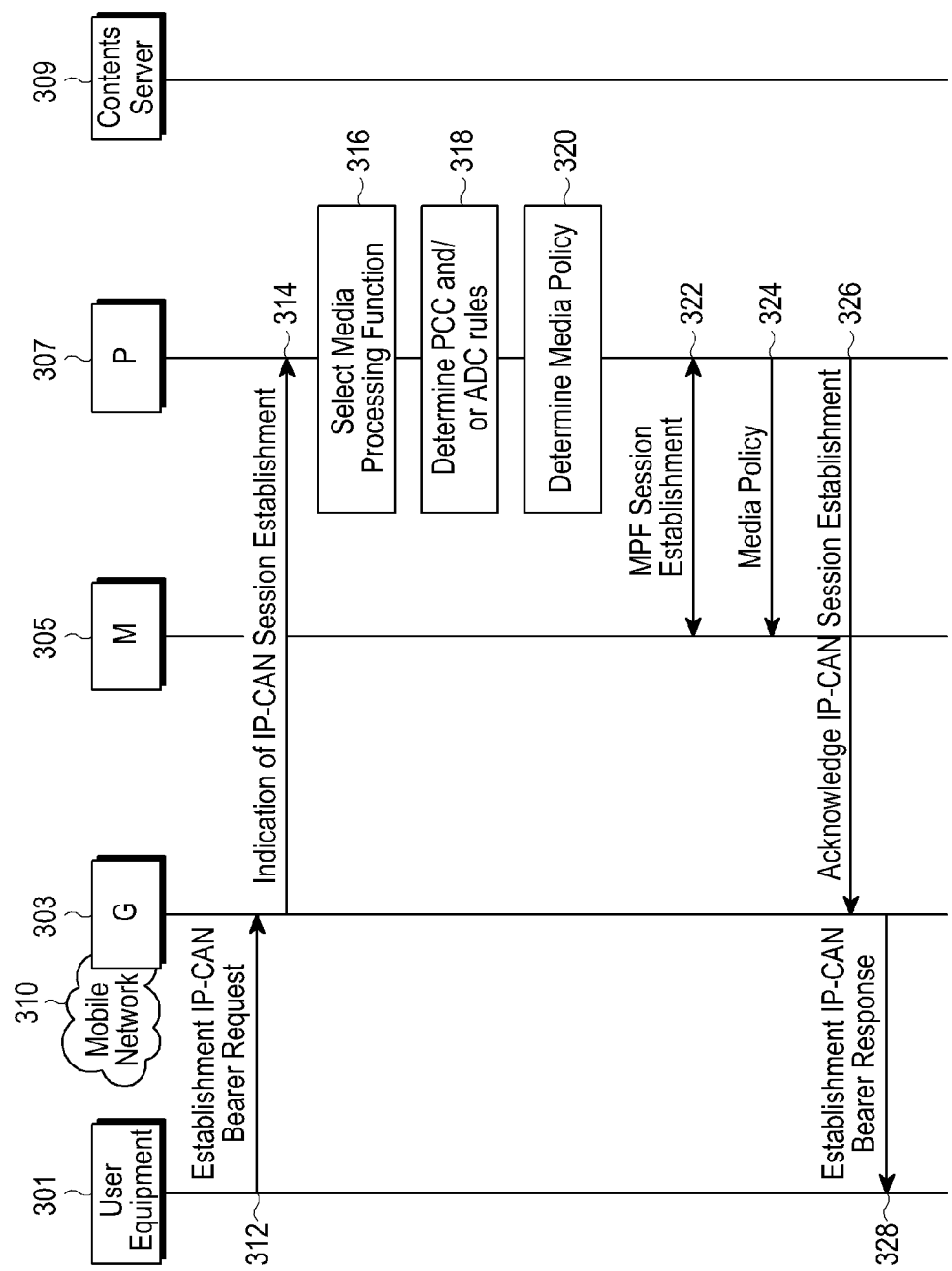
FIG. 3 schematically illustrates a process of establishing an Internet Protocol-Connectivity Access Network (IP-CAN) session in a mobile communication system according to the first embodiment of the present disclosure.

FIG. 3 schematically illustrates a process of establishing an IP-CAN session in a mobile communication system according to the first embodiment of the present disclosure.

Referring to FIG. 3, the mobile communication system includes a user equipment 301, a G 303, an M 305, a P 307, and a contents server 309.

The user equipment 301 transmits an Establishment IP-CAN Bearer Request message which requests an establishment of an IP-CAN bearer to the G 303 which is connected to a mobile network 310 at operation 312. After receiving the Establishment IP-CAN Bearer Request message from the user equipment 301, the G 303 establishes an IP-CAN session with the user equipment 301, and detects that the IP-CAN session is established. Thereafter, the G 303 transmits an Indication of IP-CAN Session Establishment message indicating that the IP-CAN session is established to the P 307 at operation 314.

After receiving the Indication of IP-CAN Session Establishment message from the G 303, the P 307 selects an MPF entity at operation 316, determines a PCC rule and/or an ADC rule based on subscription policy information at operation 318, and determines a media policy at operation 320. Here, it will be assumed that the selected MPF entity is the M 305.

Referring to FIG. 3, the P 307 determines the PCC rule and/or the ADC rule, and the media policy after selecting the MPF entity. However, it will be understood by those of ordinary skill in the art that the P 307 may perform the process of selecting the MPF entity after determining the PCC rule and/or the ADC rule, and the media policy. It will be assumed that the media policy includes information on a media processing function, such as a cache control, media trans-coding, media pacing, TCP parameter optimization, and the like.

The P 307 establishes an MPF session with the selected M 305 at operation 322. The P 307 transmits a media policy to the M 305 at operation 324, and transmits an Acknowledge IP-CAN Session Establishment message which informs that the IP-CAN session is established to the G 303 at operation 326. For example, the media policy includes a Media Processing Provisioning Information AVP.

The G 303 receives the IP-CAN Session Establishment message from the P 307, and transmits an Establishment IP-CAN Bearer Response message that informs an establishment of an IP-CAN bearer in response to the Establishment IP-CAN Bearer Request message to the user equipment 301 at operation 328. The Establishment IP-CAN Bearer Response message is a response message to the Establishment IP-CAN Bearer Request message.

Although FIG. 3 illustrates a process of establishing an IP-CAN session in a mobile communication system according to the first embodiment of the present disclosure, various changes could be made to FIG. 3. For example, although shown as a series of operations, various operations in FIG. 3 could overlap, occur in parallel, occur in a different order, or occur multiple times.

A process of establishing an IP-CAN session in a mobile communication system according to the first embodiment of the present disclosure has been described with reference to FIG. 3, and a process of installing a media policy in a mobile communication system according to the first embodiment of the present disclosure will be described with reference to FIG. 4.

Figure 4:
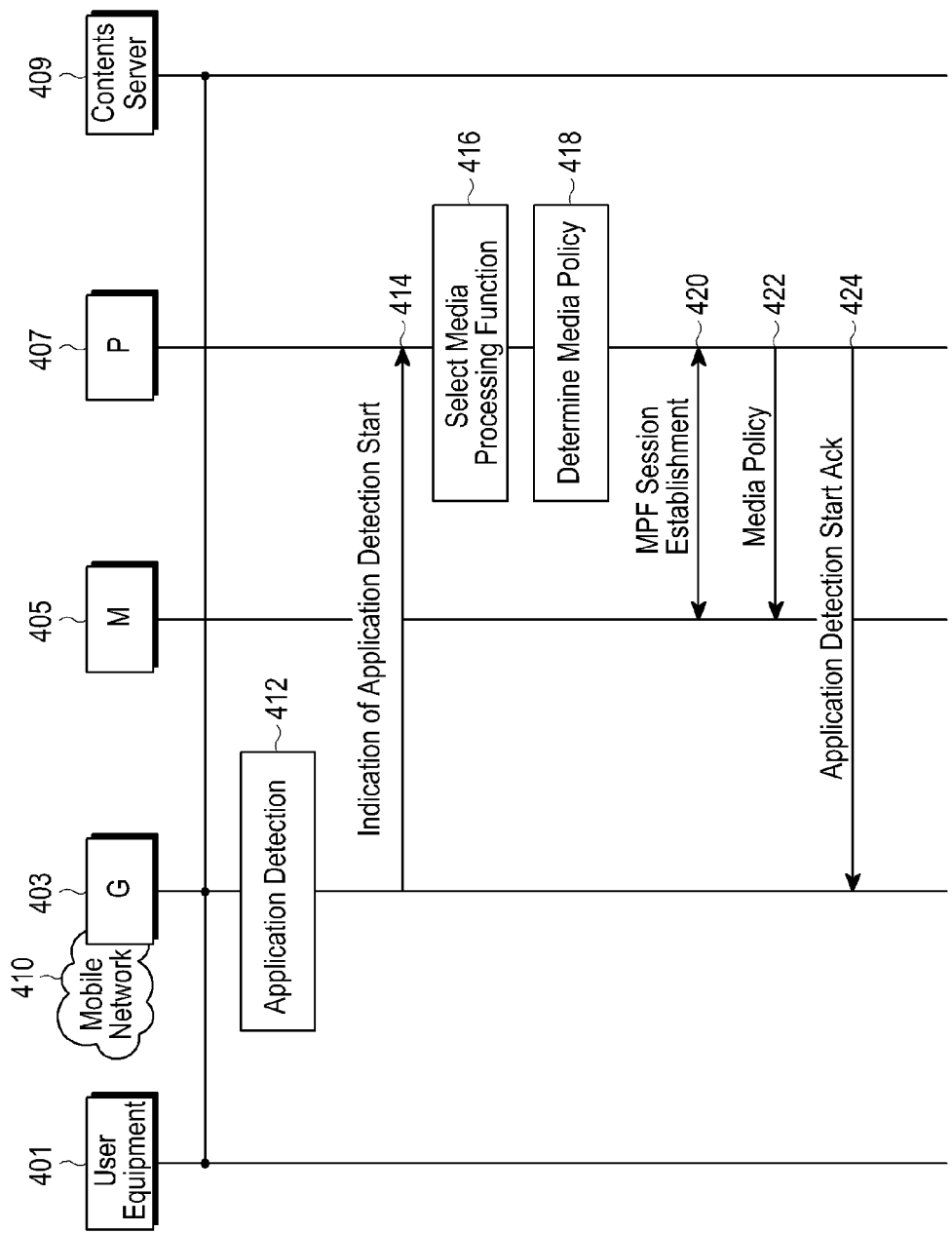
FIG. 4 schematically illustrates a process of installing a media policy in a mobile communication system according to the first embodiment of the present disclosure.

FIG. 4 schematically illustrates a process of installing a media policy in a mobile communication system according to the first embodiment of the present disclosure.

Referring to FIG. 4, the mobile communication system includes a user equipment 401, a G 403, an M 405, a P 407, and a contents server 409.

The G 403, which is connected to a mobile network 410, detects an application at operation 412, and transmits an Indication of Application Detection Start message indicating that the application is detected to the P 407 at operation 414. The Indication of Application Detection Start message includes detected application information as information on the detected application, and the detected application information may be a Detected Media Info AVP.

After receiving the Indication of Application Detection Start message from the G 403, the P 407 selects an MPF entity, i.e., the M 405 at operation 416, and determines a media policy at operation 418. Although not shown in FIG. 4, the P 407 determines a PCC rule and/or an ADC rule based on subscription policy information before determining the media policy.

The P 407 establishes an MPF session with the selected M 405 at operation 420. The P 407 transmits a Media Policy message including a media policy to the M 405. The P 407 transmits a media policy to the M 405 at operation 422. After receiving the Media Policy message from the P 407, the M 405 installs the media policy included in the Media Policy message. The P 407 transmits an Application Detection Start Ack message which informs start of detecting an application to the G 403 at operation 424. For example, the media policy includes a Media Processing Provisioning Information AVP.

Although FIG. 4 illustrates a process of installing a media policy in a mobile communication system according to the first embodiment of the present disclosure, various changes could be made to FIG. 4. For example, although shown as a series of operations, various operations in FIG. 4 could overlap, occur in parallel, occur in a different order, or occur multiple times.

A process of installing a media policy in a mobile communication system according to the first embodiment of the present disclosure has been described with reference to FIG. 4, and a process of updating a media policy according to a change of a network status in a mobile communication system according to the first embodiment of the present disclosure will be described with reference to FIG. 5.

Figure 5:
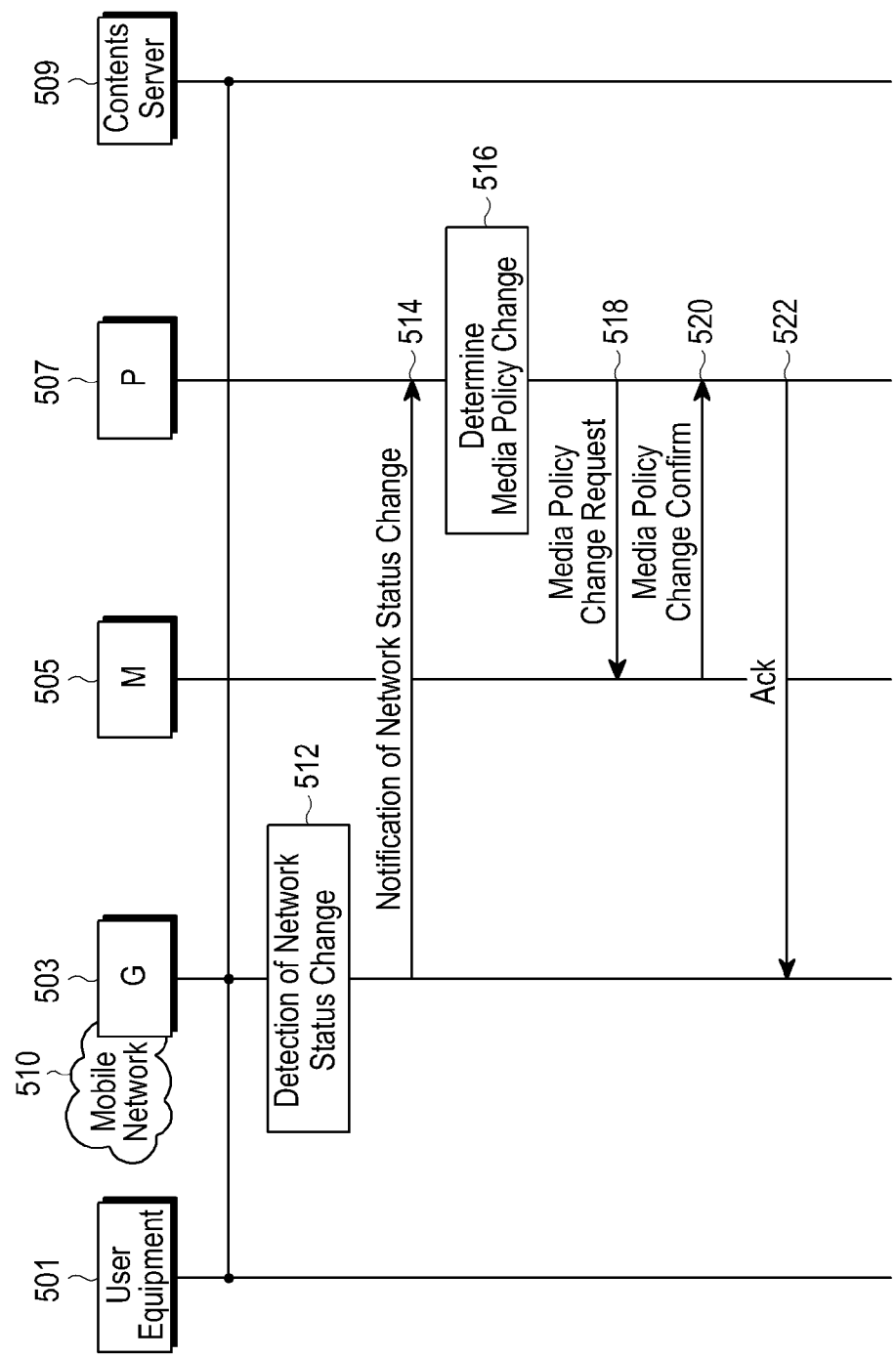
FIG. 5 schematically illustrates a process of updating a media policy according to a change of a network status in a mobile communication system according to the first embodiment of the present disclosure.

FIG. 5 schematically illustrates a process of updating a media policy according to a change of a network status in a mobile communication system according to the first embodiment of the present disclosure.

Referring to FIG. 5, the mobile communication system includes a user equipment 501, a G 503, an M 505, a P 507, and a contents server 509.

Upon detecting a change of a network status at operation 512, the G 503, which is connected to a mobile network 510, transmits a Notification of Network Status Change message which notifies the change of the network status to the P 507 at operation 514. For example, the Notification of Network Status Change message includes network status information, e.g., a Network Status Change AVP.

The P 507 receives the Notification of Network Status Change message from the G 503. At operation 516, the P 507 determines to change a media policy which has been already installed, and updates media processing information including a media processing action and parameters of the media processing action. The P 507 transmits a Media Policy Change Request message which requests the change of the media policy which has been already installed to the M 505 at operation 518. The Media Policy Change Request message includes an updated media policy.

After receiving the Media Policy Change Request message from the P 507, the M 505 updates the media policy which has been already installed based on the media processing information included in the Media Policy Change Request message, and transmits a Media Policy Change Confirm message which confirms a completion of the media policy update to the P 507 at operation 520. After receiving the Media Policy Change Confirm message from the M 505, the P 507 transmits an Ack message which informs a change of a network status to the G 503 in response to the Notification of Network Status Change message at operation 522.

Although FIG. 5 illustrates a process of updating a media policy according to a change of a network status in a mobile communication system according to the first embodiment of the present disclosure, various changes could be made to FIG. 5. For example, although shown as a series of operations, various operations in FIG. 5 could overlap, occur in parallel, occur in a different order, or occur multiple times.

A process of updating a media policy according to a change of a network status in a mobile communication system according to the first embodiment of the present disclosure has been described with reference to FIG. 5, and a process of reporting a media processing usage record if a session is released in a mobile communication system according to the first embodiment of the present disclosure will be described with reference to FIG. 6.

Figure 6:
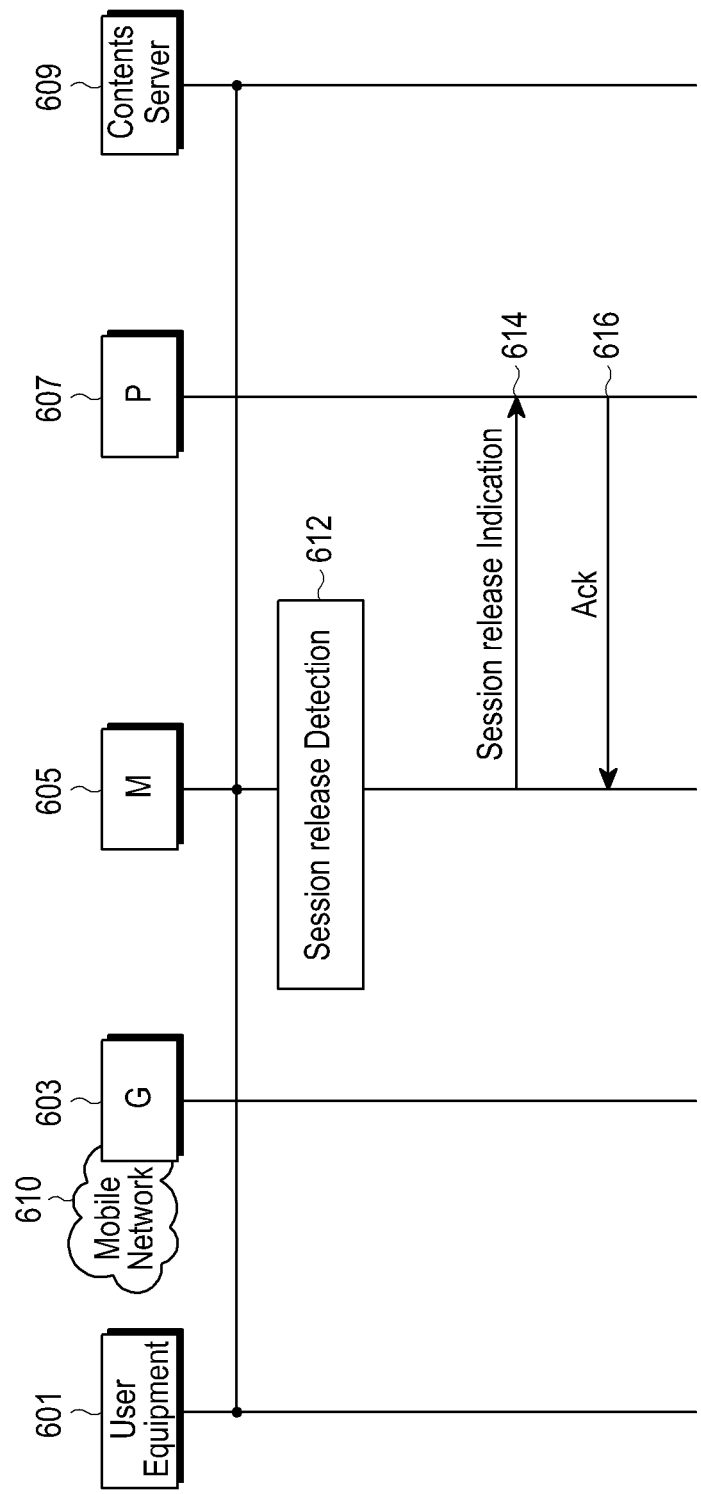
FIG. 6 schematically illustrates a process of reporting a media processing usage record if a session is released in a mobile communication system according to the first embodiment of the present disclosure.

FIG. 6 schematically illustrates a process of reporting a media processing usage record if a session is released in a mobile communication system according to the first embodiment of the present disclosure.

Referring to FIG. 6, the mobile communication system includes a user equipment 601, a G 603, which is connected to a mobile network 610, an M 605, a P 607, and a contents server 609.

Upon detecting that a session which has been already established is released at operation 612, the M 605 transmits a Session Release Indication message indicating that the session is released to the P 607 at operation 614. The Session Release Indication message includes a Media Processing Usage Record AVP. The P 607 receives the Session Release Indication message from the M 605, and transmits an Ack message which informs that the session which has been already established is released to the M 605 at operation 616.

Although FIG. 6 illustrates a process of reporting a media processing usage record if a session is released in a mobile communication system according to the first embodiment of the present disclosure, various changes could be made to FIG. 6. For example, although shown as a series of operations, various operations in FIG. 6 could overlap, occur in parallel, occur in a different order, or occur multiple times.

A process of reporting a media processing usage record if a session is released in a mobile communication system according to the first embodiment of the present disclosure has been described with reference to FIG. 6, and a structure of a mobile communication system according to a second embodiment of the present disclosure will be described with reference to FIG. 7.

Figure 7:
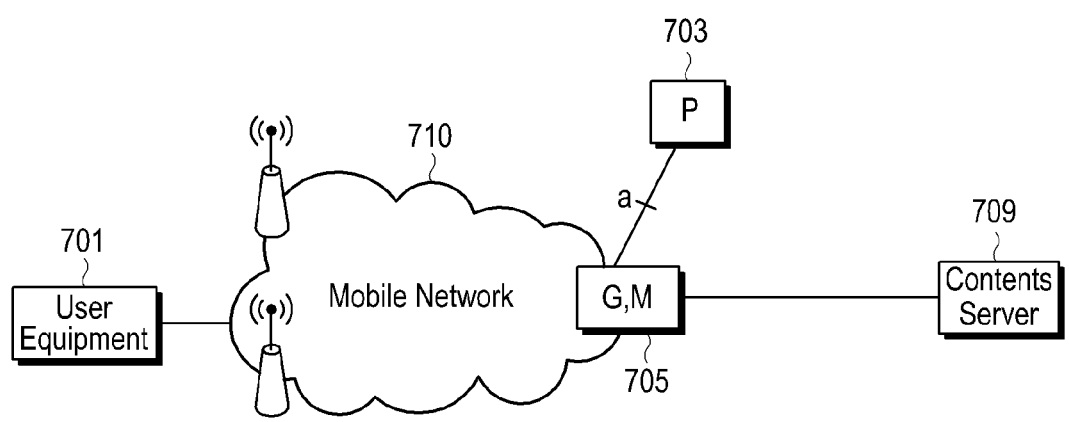
FIG. 7 schematically illustrates a structure of a mobile communication system according to a second embodiment of the present disclosure.

FIG. 7 schematically illustrates a structure of a mobile communication system according to the second embodiment of the present disclosure.

Referring to FIG. 7, the mobile communication system includes a user equipment 701, a P 703, a G,M 705, and a contents server 709. A device G is co-located with a device M, and the G,M 705 is connected to a mobile network 710. The P 703 interacts with the G,M 705 through an interface a.

A structure of a mobile communication system according to the second embodiment of the present disclosure has been described with reference to FIG. 7, and a process of establishing an IP-CAN session in a mobile communication system according to the second embodiment of the present disclosure will be described with reference to FIG. 8.

Figure 8:
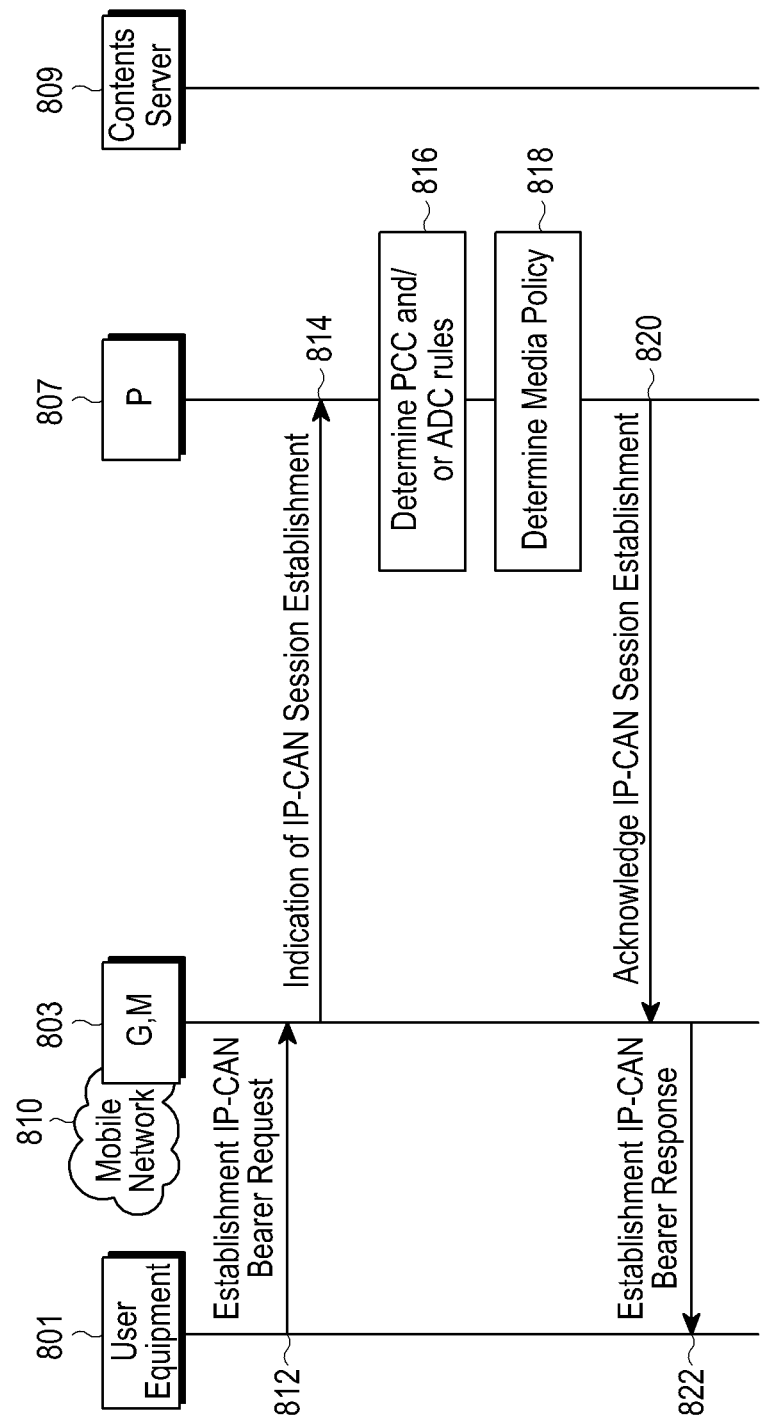
FIG. 8 schematically illustrates a process of establishing an IP-CAN session in a mobile communication system according to the second embodiment of the present disclosure.

FIG. 8 schematically illustrates a process of establishing an IP-CAN session in a mobile communication system according to the second embodiment of the present disclosure.

Referring to FIG. 8, the mobile communication system includes a user equipment 801, a G,M 803, a P 807, and a contents server 809.

The user equipment 801 transmits an Establishment IP-CAN Bearer Request message which requests to establish an IP-CAN bearer to the G,M 803 which is connected to a mobile network 810 at operation 812. The G,M 803 receives the Establishment IP-CAN Bearer Request message from the user equipment 801, detects that the IP-CAN session is established, and transmits an Indication of IP-CAN Session Establishment message indicating that the IP-CAN session is established to the P 807 at operation 814.

After receiving the Indication of IP-CAN Session Establishment message from the G,M 803, the P 807 determines a PCC rule and/or an ADC rule based on a subscription policy information at operation 816, and determines a media policy at operation 818. The P 807 transmits an Acknowledge IP-CAN Session Establishment message which informs that the IP-CAN is established to the G,M 803 at operation 820. For example, the media policy includes a Media Processing Provisioning Information AVP.

After receiving the Acknowledge IP-CAN Session Establishment message from the P 807, the G,M 803 transmits, to the user equipment 801, an Establishment IP-CAN Bearer Response message which informs that the IP-CAN is established in response to the Establishment IP-CAN Bearer Request message at operation 822.

Although FIG. 8 illustrates a process of establishing an IP-CAN session in a mobile communication system according to the second embodiment of the present disclosure, various changes could be made to FIG. 8. For example, although shown as a series of operations, various operations in FIG. 8 could overlap, occur in parallel, occur in a different order, or occur multiple times.

A process of establishing an IP-CAN session in a mobile communication system according to the second embodiment of the present disclosure has been described with reference to FIG. 8, and a process of installing a media policy in a mobile communication system according to the second embodiment of the present disclosure will be described with reference to FIG. 9.

Figure 9:
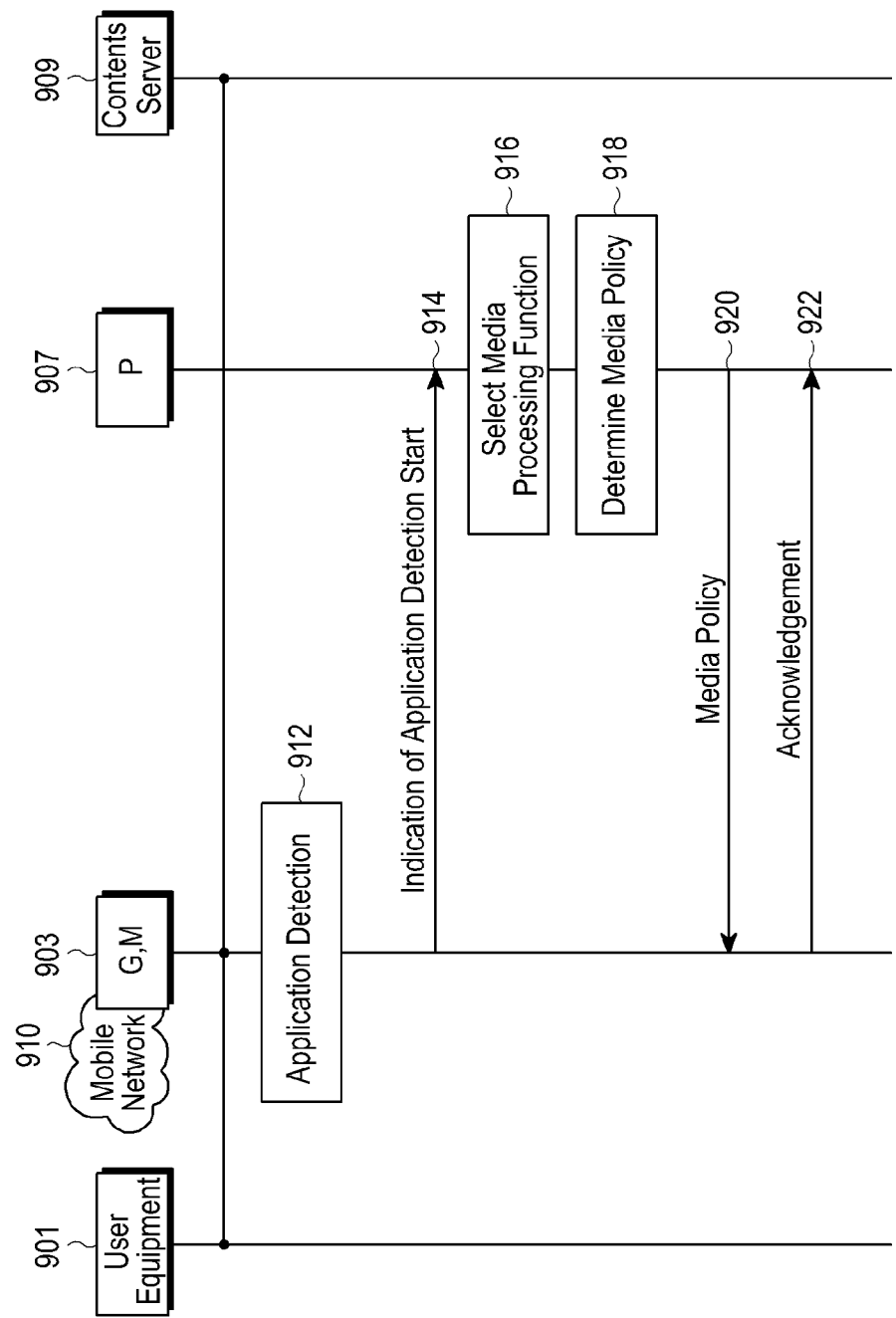
FIG. 9 schematically illustrates a process of installing a media policy in a mobile communication system according to the second embodiment of the present disclosure.

FIG. 9 schematically illustrates a process of installing a media policy in a mobile communication system according to the second embodiment of the present disclosure.

Referring to FIG. 9, the mobile communication system includes a user equipment 901, a G,M 903, a P 907, and a contents server 909.

Upon detecting an application at operation 912, the G,M 903, which is connected to a mobile network 910, transmits an Indication of Application Detection Start message indicating that the application is detected to the P 907 at operation 914. The Indication of Application Detection Start message includes detected application information as application information on the detected application. For example, the detected application information may be a Detected Media Info AVP.

After receiving the Indication of Application Detection Start message from the G,M 903, the P 907 selects an MPF entity at operation 916, and determines a media policy at operation 918. The P 907 transmits a Media Policy message including the determined media policy to the G,M 903. The P 907 transmits a media policy to the G,M 903 at operation 920. After receiving the Media Policy message from the P 907, the G,M 903 installs the media policy included in the Media Policy message. After installing the media policy, the G,M 903 transmits an Ack message at operation 922, which informs that the media policy is installed to the P 907. For example, the media policy includes a Media Processing Provisioning Information AVP.

Although FIG. 9 illustrates a process of installing a media policy in a mobile communication system according to the second embodiment of the present disclosure, various changes could be made to FIG. 9. For example, although shown as a series of operations, various operations in FIG. 9 could overlap, occur in parallel, occur in a different order, or occur multiple times.

A process of installing a media policy in a mobile communication system according to the second embodiment of the present disclosure has been described with reference to FIG. 9, and a process of updating a media policy according to a change of a network status in a mobile communication system according to the second embodiment of the present disclosure will be described with reference to FIG. 10.

Figure 10:
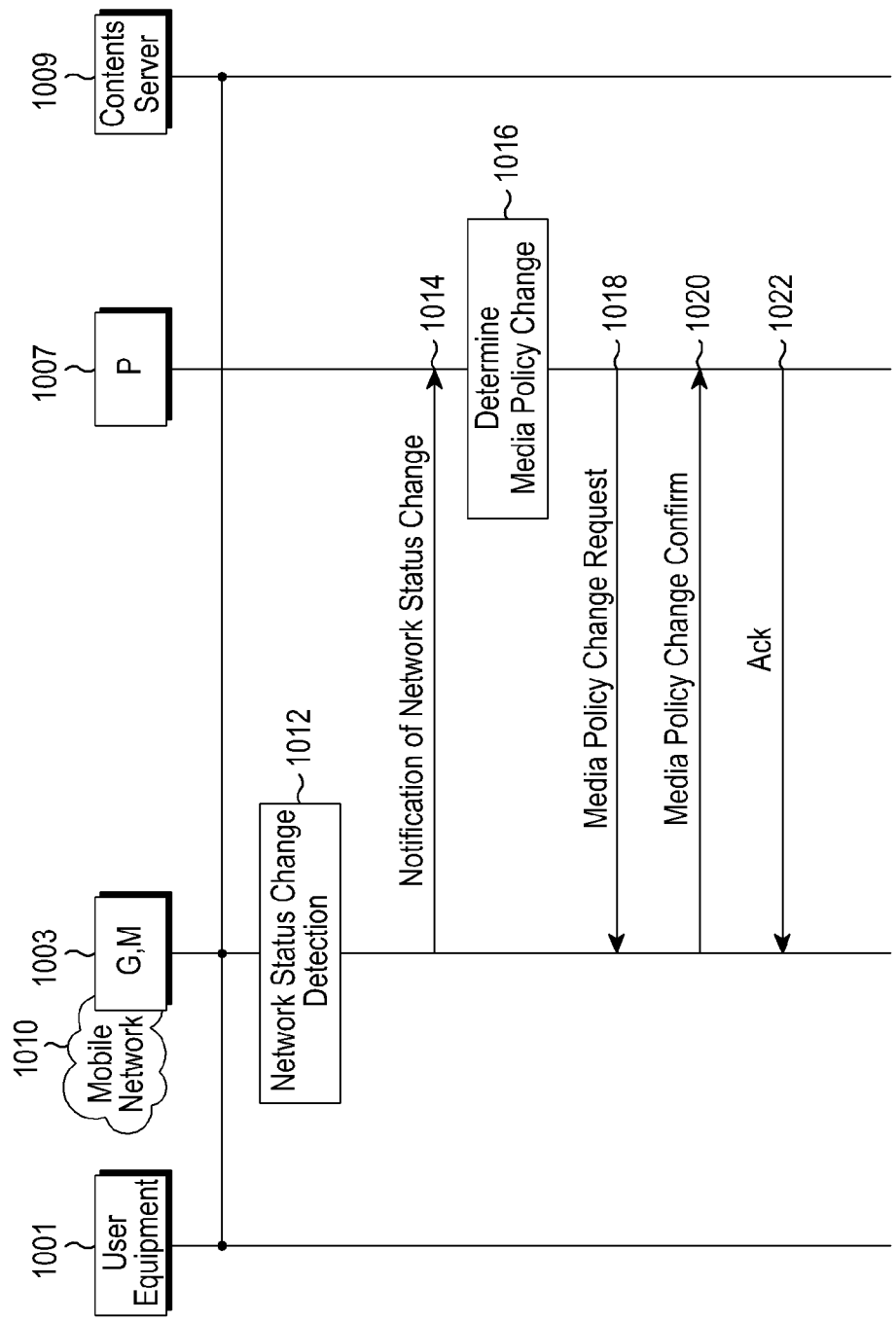
FIG. 10 schematically illustrates a process of updating a media policy according to a change of a network status in a mobile communication system according to the second embodiment of the present disclosure.

FIG. 10 schematically illustrates a process of updating a media policy according to a change of a network status in a mobile communication system according to the second embodiment of the present disclosure.

Referring to FIG. 10, the mobile communication system includes a user equipment 1001, a G,M 1003, a P 1007, and a contents server 1009.

Upon detecting a change of a network status at operation 1012, the G,M 1003, which is connected to a mobile network 1010, transmits a Notification of Network Status Change message which notifies the change of the network status to the P 1007 at operation 1014. The Notification of Network Status Change message includes network status information, e.g., a Network Status Change AVP.

The P 1007 receives the Notification of Network Status Change message from the G,M 1003, determines to change a media policy which has been already installed at operation 1016, and updates media processing information including a media processing action and parameters of the media processing action. The P 1007 transmits a Media Policy Change Request message which requests the change of the media policy which has been already installed to the G,M 1003 at operation 1018. The Media Policy Change Request message includes updated media processing information.

After receiving the Media Policy Change Request message from the P 1007, the G,M 1003 updates the media policy which has been already installed based on the media processing information included in the Media Policy Change Request message, and transmits a Media Policy Change Confirm message which confirms a completion of updating the media policy to the P 1007 at operation 1020. The P 1007 receives the Notification of Network Status Change message from the G,M 1003, and transmits an Ack message which informs the change of the network status in response to the Notification of Network Status Change message to the G,M 1003 at operation 1022.

Although FIG. 10 illustrates a process of updating a media policy according to a change of a network status in a mobile communication system according to the second embodiment of the present disclosure, various changes could be made to FIG. 10. For example, although shown as a series of operations, various operations in FIG. 10 could overlap, occur in parallel, occur in a different order, or occur multiple times.

A process of updating a media policy according to a change of a network status in a mobile communication system according to the second embodiment of the present disclosure has been described with reference to FIG. 10, and a process of reporting a media processing usage record if a session is released in a mobile communication system according to the second embodiment of the present disclosure will be described with reference to FIG. 11.

Figure 11:
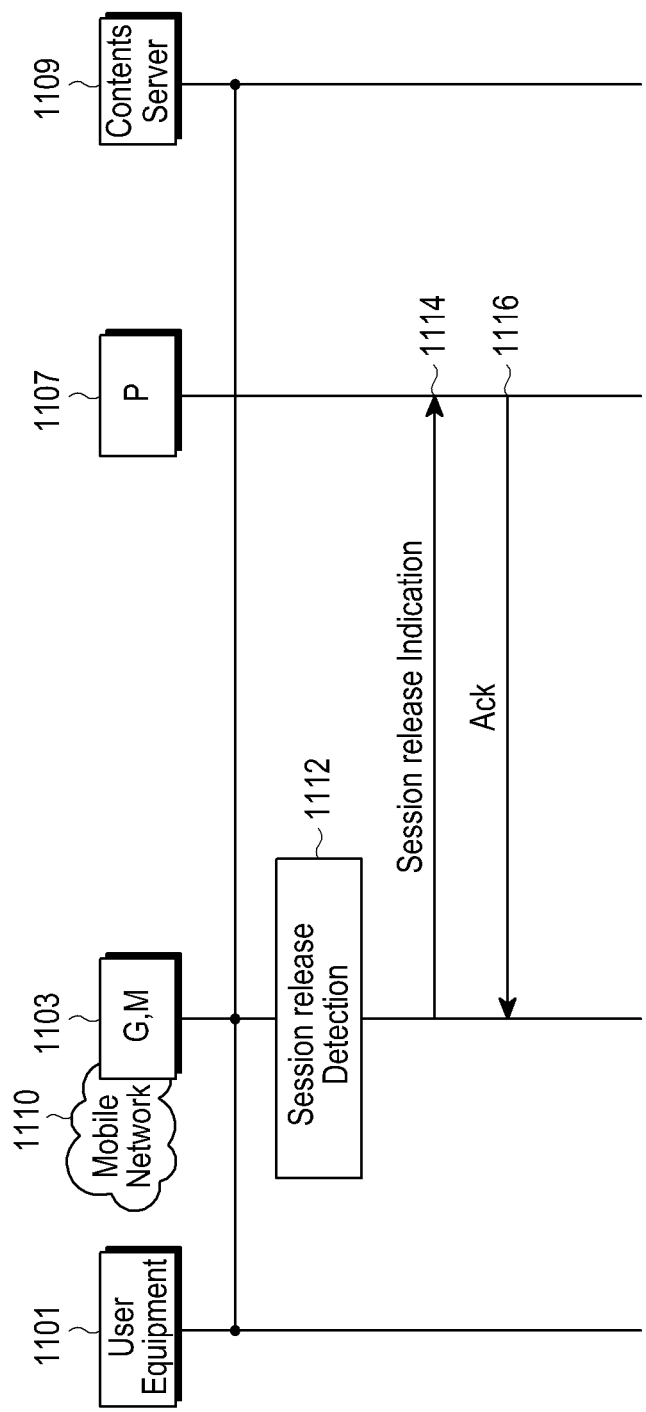
FIG. 11 schematically illustrates a process of reporting a media processing usage record if a session is released in a mobile communication system according to the second embodiment of the present disclosure.

FIG. 11 schematically illustrates a process of reporting a media processing usage record if a session is released in a mobile communication system according to the second embodiment of the present disclosure.

Referring to FIG. 11, the mobile communication system includes a user equipment 1101, a G,M 1103, a P 1107, and a contents server 1109.

Upon detecting that a session which has been already established is released at operation 1112, the G,M 1103, which is connected to a mobile network 1110, transmits a Session Release Indication message indicating that the session is released to the P 1107 at operation 1114. The Session Release Indication message includes a Media Processing Usage Record AVP. The P 1107 receives the Session Release Indication message from the G,M 1103, and transmits an Ack message which informs that the session which has been already established is released to the G,M 1103 at operation 1116.

Although FIG. 11 illustrates a process of reporting a media processing usage record if a session is released in a mobile communication system according to the second embodiment of the present disclosure, various changes could be made to FIG. 11. For example, although shown as a series of operations, various operations in FIG. 11 could overlap, occur in parallel, occur in a different order, or occur multiple times.

A process of reporting a media processing usage record if a session is released in a mobile communication system according to the second embodiment of the present disclosure has been described with reference to FIG. 11, and a structure of a mobile communication system according to a third embodiment of the present disclosure will be described with reference to FIG. 12.

Figure 12:
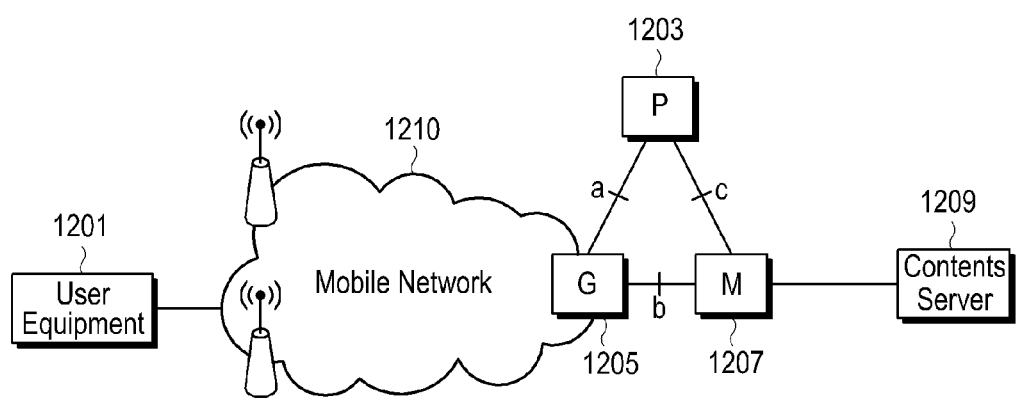
FIG. 12 schematically illustrates a structure of a mobile communication system according to a third embodiment of the present disclosure.

FIG. 12 schematically illustrates a structure of a mobile communication system according to the third embodiment of the present disclosure.

Referring to FIG. 12, the mobile communication system includes a user equipment 1201, a P 1203, a G 1205, an M 1207, and a contents server 1209, and the G 1205 is connected to a mobile network 1210.

As illustrated in FIG. 12, the M 1207 is located apart from the G 1205, the P 1203 interacts with the G 1205 through an interface a, the G 1205 interacts with the M 1207 through an interface b, and the P 1203 interacts with the M 1207 through an interface c.

A structure of a mobile communication system according to the third embodiment of the present disclosure has been described with reference to FIG. 12, and a process of installing a media policy in a mobile communication system according to the third embodiment of the present disclosure will be described with reference to FIG. 13.

Figure 13:
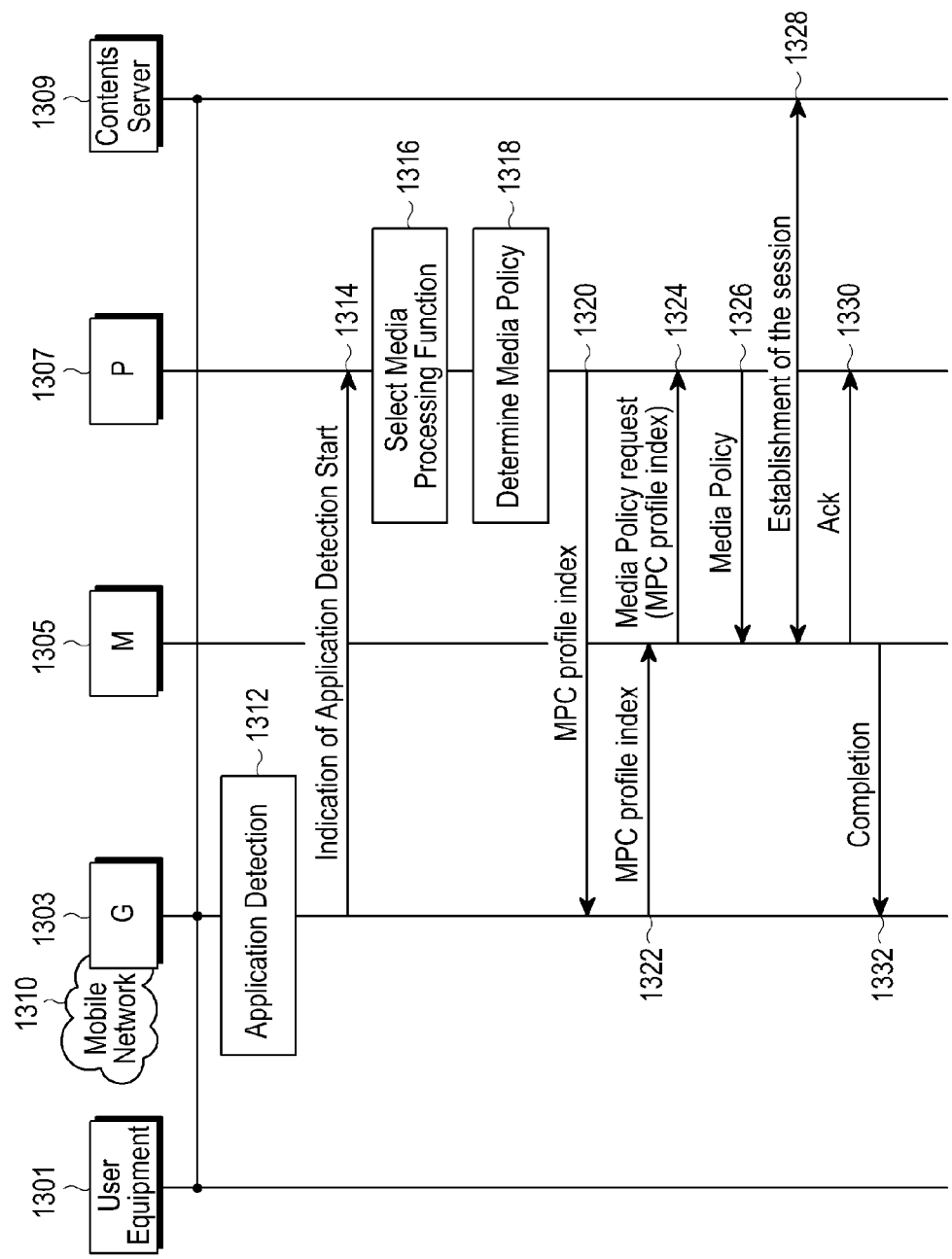
FIG. 13 schematically illustrates a process of installing a media policy in a mobile communication system according to the third embodiment of the present disclosure.

FIG. 13 schematically illustrates a process of installing a media policy in a mobile communication system according to the third embodiment of the present disclosure.

Referring to FIG. 13, the mobile communication system includes a user equipment 1301, a G 1303, an M 1305, a P 1307, and a contents server 1309.

Upon detecting an application at operation 1312, the G 1303, which is connected to a mobile network 1310, transmits an Indication of Application Detection Start message indicating that the application is detected to the P 1307 at operation 1314. The Indication of Application Detection Start message includes detected application information as information on the detected application. For example, the detected application information may be a Detected Media Info AVP.

The P 1307 receives the Indication of Application Detection Start message from the G 1303, selects an MPF entity, i.e., the M 1305 at operation 1316, and determines a media policy at operation 1318. Although not shown in FIG. 13, the P 1307 determines a PCC rule and/or an ADC rule based on subscription policy information before determining the media policy.

The P 1307 transmits a Media Processing Control (MPC) profile index message including an index for a Media Processing Info AVP, i.e., an MPC profile index to the G 1303 at operation 1320. For example, the P 1307 may use an extended header of an application layer, e.g., an HTTP header in order to transmit the MPC profile index message. The G 1303 receives the MPC profile index message from the P 1307, and transfers the received MPC profile index message to the M 1305 at operation 1322. The M 1305 receives the MPC profile index message from the G 1303, and requests a media policy by transmitting a Media Policy Request message including the MPC profile index included in the MPC profile index message to the P 1307 at operation 1324. After receiving the Media Policy Request message from the M 1305, the P 1307 transmits an MPC profile index message including the requested media policy to the M 1305 at operation 1326.

The M 1305 receives the MPC profile index message from the P 1307, establishes a session with the contents server 1309 at operation 1328, transmits an Ack message which informs a completion of the session establishment to the P 1307 at 1330, and transmits a Complete message which informs the completion of the session establishment to the G 1303 at operation 1332.

Although FIG. 13 illustrates a process of installing a media policy in a mobile communication system according to the third embodiment of the present disclosure, various changes could be made to FIG. 13. For example, although shown as a series of operations, various operations in FIG. 13 could overlap, occur in parallel, occur in a different order, or occur multiple times.

A process of installing a media policy in a mobile communication system according to the third embodiment of the present disclosure has been described with reference to FIG. 13, and a process of updating a media policy according to a change of a network status in a mobile communication system according to the third embodiment of the present disclosure will be described with reference to FIG. 14.

Figure 14:
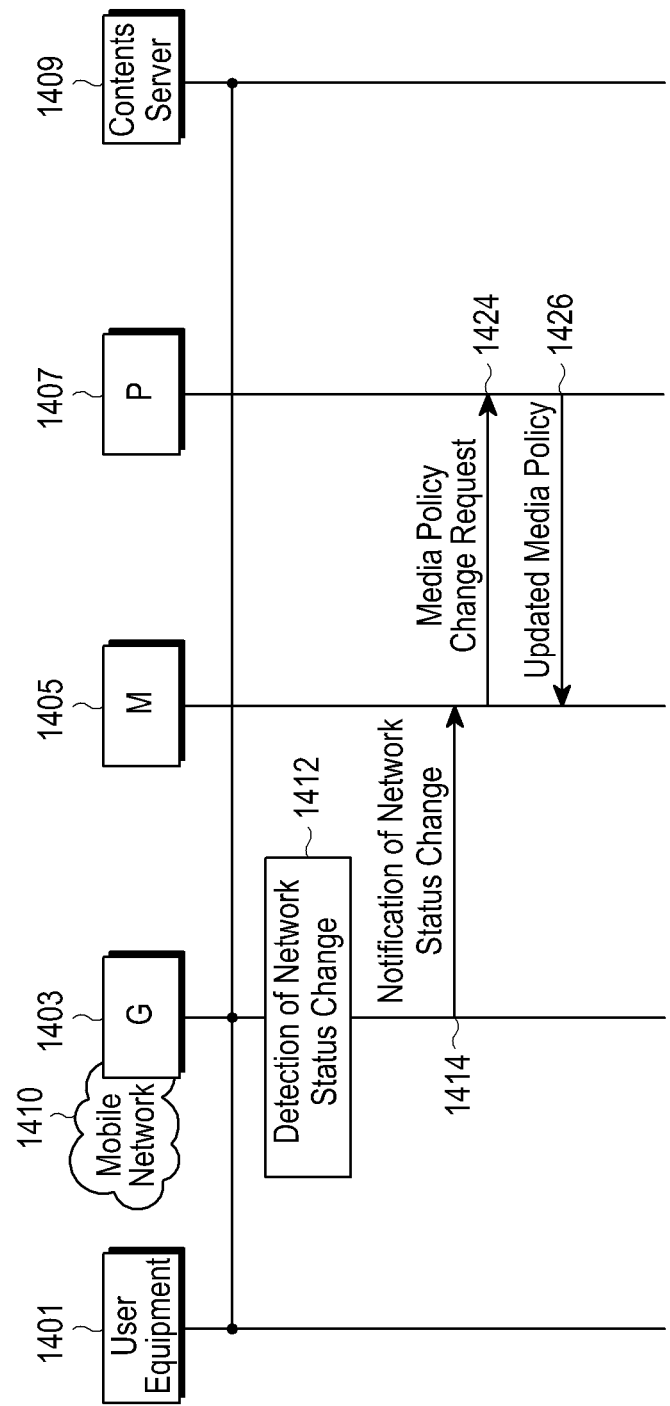
FIG. 14 schematically illustrates a process of updating a media policy according to a change of a network status in a mobile communication system according to the third embodiment of the present disclosure.

FIG. 14 schematically illustrates a process of updating a media policy according to a change of a network status in a mobile communication system according to the third embodiment of the present disclosure.

Referring to FIG. 14, the mobile communication system includes a user equipment 1401, a G 1403, an M 1405, a P 1407, and a contents server 1409.

Upon detecting a change of network status at operation 1412, the G 1403, which is connected to a mobile network 1410, transmits a Notification of Network Status Change message which notifies the change of the network status to the M 1405 at operation 1414. The Notification of Network Status Change message includes network status information, e.g., a Network Status Change AVP.

The M 1405 receives the Notification of Network Status Change message from the G 1403, and transmits a Media Policy Change Request message which requests a change of a media policy which has been already installed to the P 1407 at operation 1424. After receiving the Media Policy Change Request message from the M 1405, the P 1407 updates media processing information including a media processing action and parameters of the media processing action on a session which has been already established, and transmits an Updated Media Policy message including the updated media processing information, i.e., an updated media policy to the M 1405 at operation 1426. Thereafter, the M 1405 updates the media policy which has been already installed to the updated media policy included in the Updated Media Policy message.

Although FIG. 14 illustrates a process of updating a media policy according to a change of a network status in a mobile communication system according to the third embodiment of the present disclosure, various changes could be made to FIG. 14. For example, although shown as a series of operations, various operations in FIG. 14 could overlap, occur in parallel, occur in a different order, or occur multiple times.

A process of updating a media policy according to a change of a network status in a mobile communication system according to the third embodiment of the present disclosure has been described with reference to FIG. 14, and a structure of a mobile communication system according to a fourth embodiment of the present disclosure will be described with reference to FIG. 15.

Figure 15:
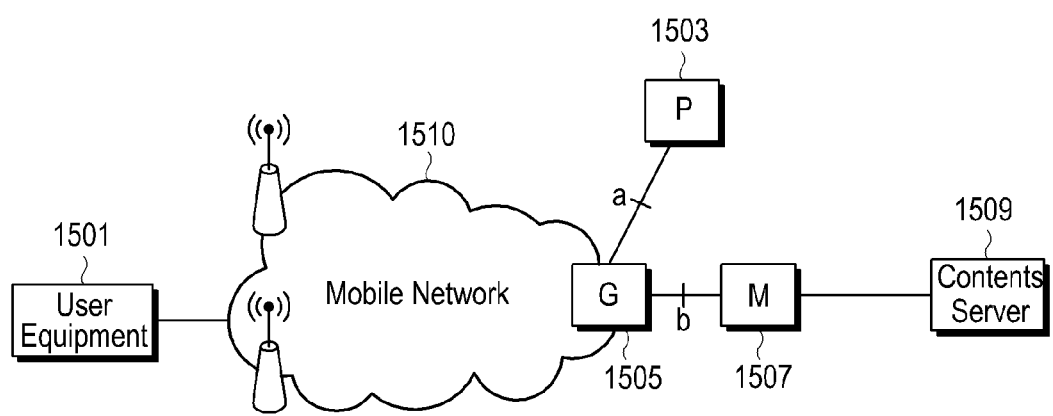
FIG. 15 schematically illustrates a structure of a mobile communication system according to a fourth embodiment of the present disclosure.

FIG. 15 schematically illustrates a structure of a mobile communication system according to the fourth embodiment of the present disclosure.

Referring to FIG. 15, the mobile communication system includes a user equipment 1501, a P 1503, a G 1505, an M 1507, and a contents server 1509, and the G 1505 is connected to a mobile network 1510.

As illustrated in FIG. 15, the M 1507 is located apart from the G 1505, the P 1503 interacts with the G 1505 via an interface a, and the G 1505 interacts with the M 1507 via an interface b.

A structure of a mobile communication system according to the fourth embodiment of the present disclosure has been described with reference to FIG. 15, and a process of installing a media policy in a mobile communication system according to the fourth embodiment of the present disclosure will be described with reference to FIG. 16.

Figure 16:
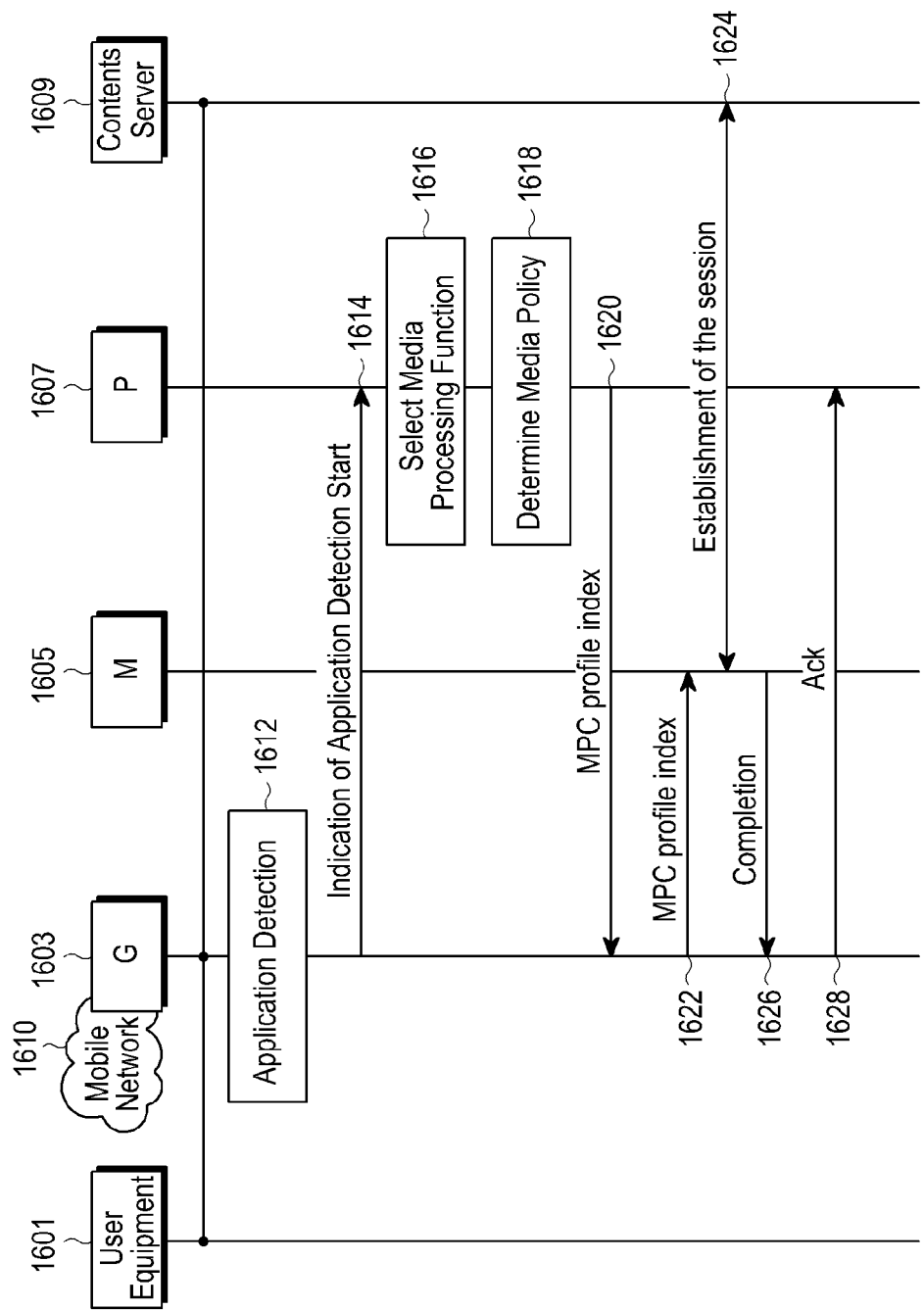
FIG. 16 schematically illustrates a process of installing a media policy in a mobile communication system according to the fourth embodiment of the present disclosure.

FIG. 16 schematically illustrates a process of installing a media policy in a mobile communication system according to the fourth embodiment of the present disclosure.

Referring to FIG. 16, the mobile communication system includes a user equipment 1601, a G 1603, an M 1605, a P 1607, and a contents server 1609.

Upon detecting an application at operation 1612, the G 1603, which is connected to a mobile network 1610, transmits an Indication of Application Detection Start message indicating that the application is detected to the P 1607 at operation 1614. The Indication of Application Detection Start message includes detected application information as information on the detected application. For example, the detected application information may be a Detected Media Info AVP.

The P 1607 selects an MPF entity, i.e., the M 1605, at operation 1616, and determines a media policy at operation 1618. Although not shown in FIG. 16, the P 1607 determines a PCC rule and/or an ADC rule based on subscription policy information before determining the media policy.

The P 1607 transmits an index for media processing information, i.e., an MPC profile index to the G 1603 at operation 1620. For example, the P 1607 may use an extended header of an application layer, e.g., an HTTP header in order to transmit the MPC profile index. The G 1603 receives the MPC profile index from the P 1607, and transfers the received MPC profile index to the M 1605 at operation 1622.

The M 1605 establishes a session with the contents server 1609 at operation 1624, and transmits a Complete message which informs a completion of the session to the G 1603 at 1626. The G 1603 transmits, at operation 1628, an Ack message to the P 1607 in response to the reception of the MPC profile index described at operation 1620. Similarly, the M 1605 performs a TCP proxy function for an application session between the user equipment 1601 and the contents server 1609.

Although FIG. 16 illustrates a process of installing a media policy in a mobile communication system according to the fourth embodiment of the present disclosure, various changes could be made to FIG. 16. For example, although shown as a series of operations, various operations in FIG. 16 could overlap, occur in parallel, occur in a different order, or occur multiple times.

A process of installing a media policy in a mobile communication system according to the fourth embodiment of the present disclosure has been described with reference to FIG. 16, and a process of updating a media policy according to a change of a network status in a mobile communication system according to the fourth embodiment of the present disclosure will be described with reference to FIG. 17.

Figure 17:
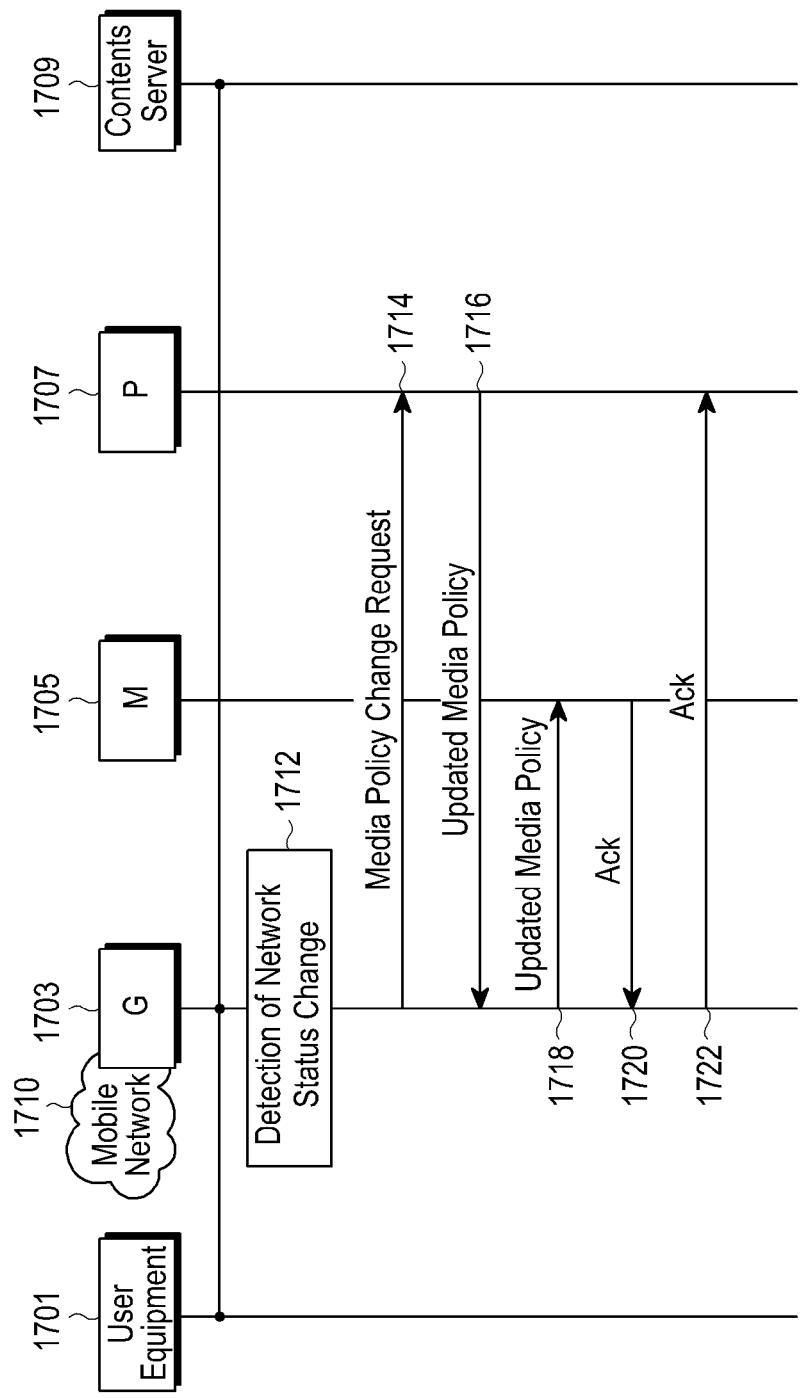
FIG. 17 schematically illustrates a process of updating a media policy according to a change of a network status in a mobile communication system according to the fourth embodiment of the present disclosure.

FIG. 17 schematically illustrates a process of updating a media policy according to a change of a network status in a mobile communication system according to the fourth embodiment of the present disclosure.

Referring to FIG. 17, the mobile communication system includes a user equipment 1701, a G 1703, an M 1705, a P 1707, and a contents server 1709.

Upon detecting a change of a network status at operation 1712, the G 1703, which is connected to a mobile network 1710, transmits a Media Policy Change Request message which requests to change a media policy which has been already installed to the P1707 at operation 1714. The P1707 receives the Media Policy Change Request message from the G 1703, updates media processing information including a media processing action and parameters of the media processing action in a session which has been already established, and transmits an Updated Media Policy message including the updated media processing information to the G 1703 at operation 1716. The G 1703 transmits the Updated Media Policy message to the M 1705 at operation 1718.

After receiving the Updated Media Policy message from the G 1703, the M 1705 transmits an Ack message which acknowledges the reception of the Updated Media Policy message to the G 1703 at operation 1720. After receiving the Ack message from the M 1705, the G 1703 transmits an Ack message as a response message to the Updated Media Policy message described at operation 1716 to the P 1707 at operation 1722. As not shown in FIG. 17, the M 1705 updates a media policy which has been already installed to an updated media policy included in the Updated Media Policy message.

Although FIG. 17 illustrates a process of updating a media policy according to a change of a network status in a mobile communication system according to the fourth embodiment of the present disclosure, various changes could be made to FIG. 17. For example, although shown as a series of operations, various operations in FIG. 17 could overlap, occur in parallel, occur in a different order, or occur multiple times.

A process of updating a media policy according to a change of a network status in a mobile communication system according to the fourth embodiment of the present disclosure has been described with reference to FIG. 17, and a process of reporting a media processing use record if a session is released in a mobile communication system according to the fourth embodiment of the present disclosure will be described with reference to FIG. 18.

Figure 18:
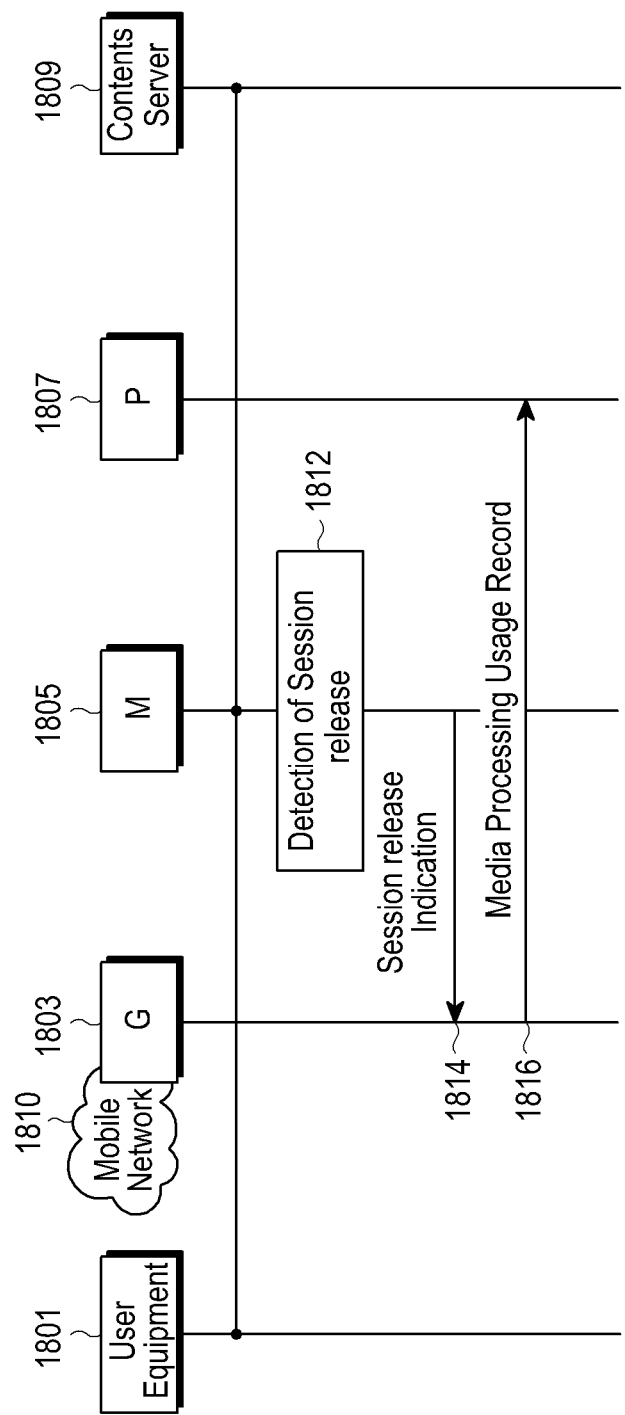
FIG. 18 schematically illustrates a process of reporting a media processing usage record if a session is released in a mobile communication system according to the fourth embodiment of the present disclosure.

FIG. 18 schematically illustrates a process of reporting a media processing usage record if a session is released in a mobile communication system according to the fourth embodiment of the present disclosure.

Referring to FIG. 18, the mobile communication system includes a user equipment 1801, a G 1803, which is connected to a mobile network 1810, an M 1805, a P 1807, and a contents server 1809.

Upon detecting that a session which has been already established is released at operation 1812, the M 1805 transmits a Session Release Indication message indicating that the session is released to the G 1803 at operation 1814. The Session Release Indication message includes a Media Processing Usage Record AVP. The G 1803 receives the Session Release Indication message from the M 1805, and transmits a Media Processing Usage Record message including the Media Processing Usage Record AVP in the Session Release Indication message to the P 1807 at operation 1816.

Although FIG. 18 illustrates a process of reporting a media processing use record if a session is released in a mobile communication system according to the fourth embodiment of the present disclosure, various changes could be made to FIG. 18. For example, although shown as a series of operations, various operations in FIG. 18 could overlap, occur in parallel, occur in a different order, or occur multiple times.

A process of reporting a media processing use record if a session is released in a mobile communication system according to the fourth embodiment of the present disclosure has been described with reference to FIG. 18, and an inner structure of a user equipment in a mobile communication system according to an embodiment of the present disclosure will be described with reference to FIG. 19.

Figure 19:
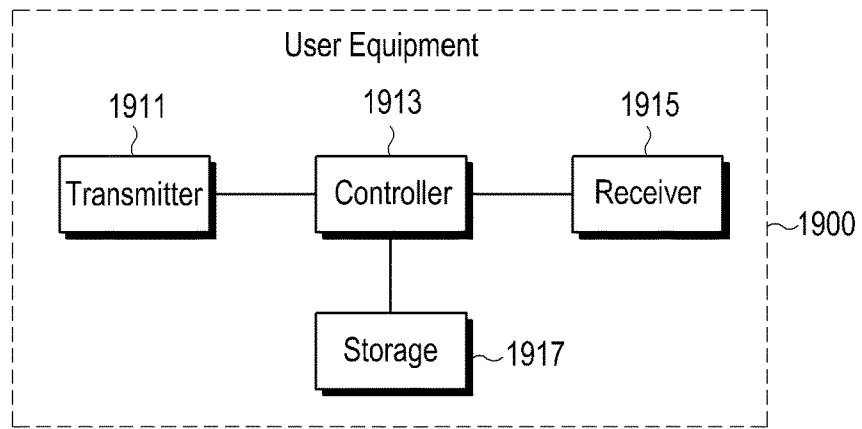
FIG. 19 schematically illustrates an inner structure of a user equipment in a mobile communication system according to an embodiment of the present disclosure.

FIG. 19 schematically illustrates an inner structure of a user equipment in a mobile communication system according to an embodiment of the present disclosure.

Referring to FIG. 19, a user equipment 1900 includes a transmitter 1911, a controller 1913, a receiver 1915, and a storage 1917.

The controller 1913 controls the overall operation of the user equipment 1900. More particularly, the controller 1913 controls the user equipment 1900 to perform a media processing operation. The media processing operation is performed in the manner described with reference to FIGS. 1 to 18 and a description thereof will be omitted herein.

The transmitter 1911 transmits various signals and messages to other entities under a control of the controller 1913.

The receiver 1915 receives various signals and messages from other entities under a control of the controller 1913.

The storage 1917 stores various programs and data used for performing the media processing operation in FIGS. 1 to 18, and data which occurs while the media processing operation in FIGS. 1 to 18 is performed.

While the transmitter 1911, the controller 1913, the receiver 1915, and the storage 1917 are shown in FIG. 19 as separate units, it is to be understood that this is merely for convenience of description. In other words, two or more of the transmitter 1911, the controller 1913, the receiver 1915, and the storage 1917 may be incorporated into a single unit.

An inner structure of a user equipment in a mobile communication system according to an embodiment of the present disclosure has been described with reference to FIG. 19, and an inner structure of a device P in a mobile communication system according to an embodiment of the present disclosure will be described with reference to FIG. 20.

Figure 20:
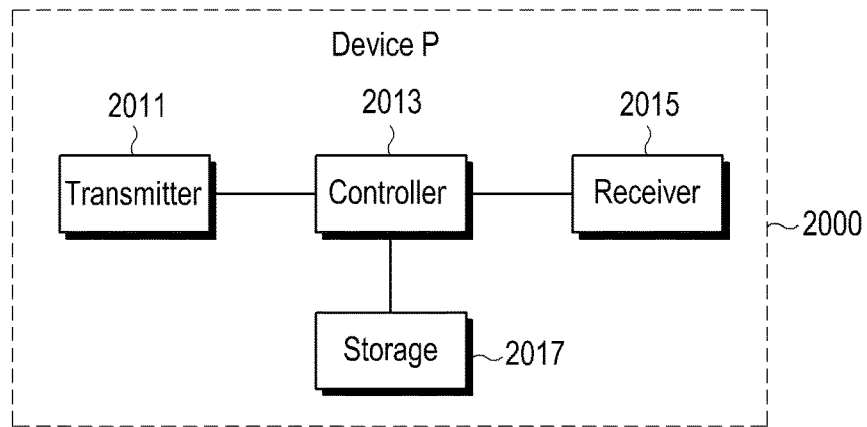
FIG. 20 schematically illustrates an inner structure of a device P in a mobile communication system according to an embodiment of the present disclosure.

FIG. 20 schematically illustrates an inner structure of a device P in a mobile communication system according to an embodiment of the present disclosure.

Referring to FIG. 20, a device P 2000 includes a transmitter 2011, a controller 2013, a receiver 2015, and a storage 2017.

The controller 2013 controls the overall operation of the device P 2000. More particularly, the controller 2013 controls the device P 2000 to perform a media processing operation. The media processing operation is performed in the manner described with reference to FIGS. 1 to 18 and a description thereof will be omitted herein.

The transmitter 2011 transmits various signals and messages to other entities under a control of the controller 2013.

The receiver 2015 receives various signals and messages from other entities under a control of the controller 2013.

The storage 2017 stores various programs and data used for performing the media processing operation in FIGS. 1 to 18, and data which occurs while the media processing operation in FIGS. 1 to 18 is performed.

While the transmitter 2011, the controller 2013, the receiver 2015, and the storage 2017 are shown in FIG. 20 as separate units, it is to be understood that this is merely for convenience of description. In other words, two or more of the transmitter 2011, the controller 2013, the receiver 2015, and the storage 2017 may be incorporated into a single unit.

An inner structure of a device P in a mobile communication system according to an embodiment of the present disclosure has been described with reference to FIG. 20, and an inner structure of a device G in a mobile communication system according to an embodiment of the present disclosure will be described with reference to FIG. 21.

Figure 21:
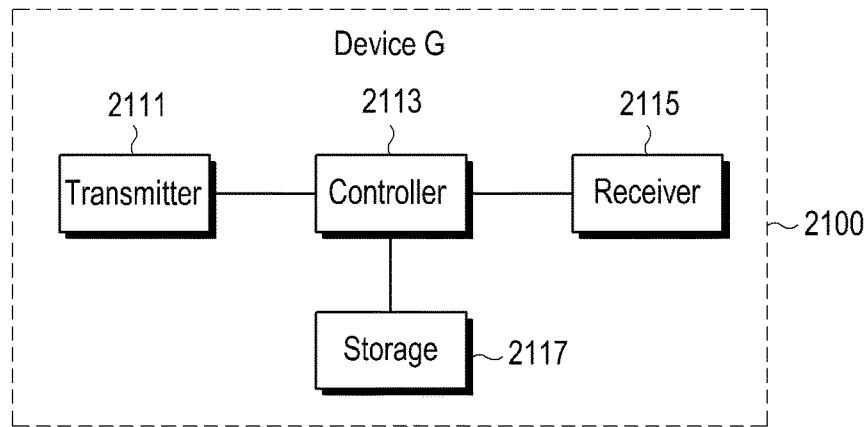
FIG. 21 schematically illustrates an inner structure of a device G in a mobile communication system according to an embodiment of the present disclosure.

FIG. 21 schematically illustrates an inner structure of a device G in a mobile communication system according to an embodiment of the present disclosure.

Referring to FIG. 21, a device G 2100 includes a transmitter 2111, a controller 2113, a receiver 2115, and a storage 2117.

The controller 2113 controls the overall operation of the device G 2100. More particularly, the controller 2113 controls the device G 2100 to perform a media processing operation. The media processing operation is performed in the manner described with reference to FIGS. 1 to 18 and a description thereof will be omitted herein.

The transmitter 2111 transmits various signals and messages to other entities under a control of the controller 2113.

The receiver 2115 receives various signals and messages from other entities under a control of the controller 2113.

The storage 2117 stores various programs and data used for performing the media processing operation in FIGS. 1 to 18, and data which occurs while the media processing operation in FIGS. 1 to 18 is performed.

While the transmitter 2111, the controller 2113, the receiver 2115, and the storage 2117 are shown in FIG. 21 as separate units, it is to be understood that this is merely for convenience of description. In other words, two or more of the transmitter 2111, the controller 2113, the receiver 2115, and the storage 2117 may be incorporated into a single unit.

An inner structure of a device G in a mobile communication system according to an embodiment of the present disclosure has been described with reference to FIG. 21, and an inner structure of a device M in a mobile communication system according to an embodiment of the present disclosure will be described with reference to FIG. 22.

Figure 22:
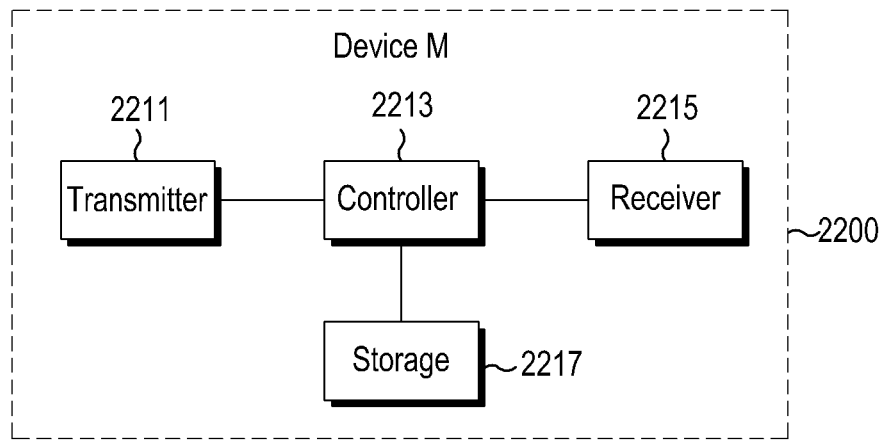
FIG. 22 schematically illustrates an inner structure of a device M in a mobile communication system according to an embodiment of the present disclosure.

FIG. 22 schematically illustrates an inner structure of a device M in a mobile communication system according to an embodiment of the present disclosure.

Referring to FIG. 22, a device M 2200 includes a transmitter 2211, a controller 2213, a receiver 2215, and a storage 2217.

The controller 2213 controls the overall operation of the device M 2200. More particularly, the controller 2213 controls the device M 2200 to perform a media processing operation. The media processing operation is performed in the manner described with reference to FIGS. 1 to 18 and a description thereof will be omitted herein.

The transmitter 2211 transmits various signals and messages to other entities under a control of the controller 2213.

The receiver 2215 receives various signals and messages from other entities under a control of the controller 2213.

The storage 2217 stores various programs and data used for performing the media processing operation in FIGS. 1 to 18, and data which occurs while the media processing operation in FIGS. 1 to 18 is performed.

While the transmitter 2211, the controller 2213, the receiver 2215, and the storage 2217 are shown in FIG. 22 as separate units, it is to be understood that this is merely for convenience of description. In other words, two or more of the transmitter 2211, the controller 2213, the receiver 2215, and the storage 2217 may be incorporated into a single unit.

An inner structure of a device M in a mobile communication system according to an embodiment of the present disclosure has been described with reference to FIG. 22, and an inner structure of a contents server in a mobile communication system according to an embodiment of the present disclosure will be described with reference to FIG. 23.

Figure 23:
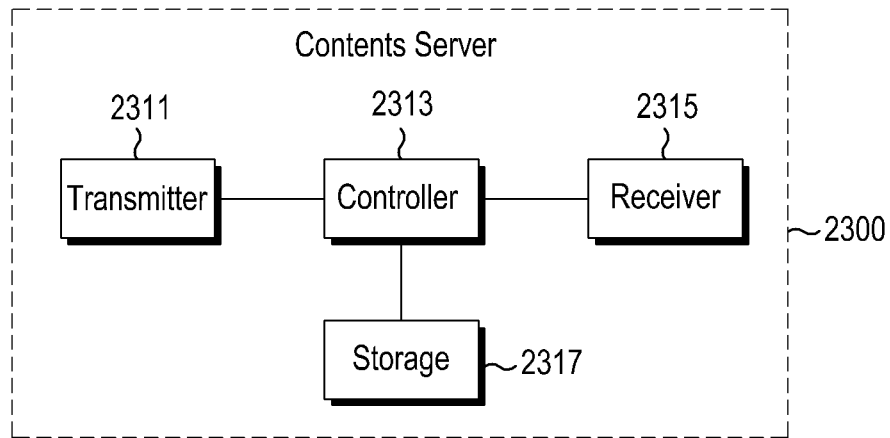
FIG. 23 schematically illustrates an inner structure of a contents server in a mobile communication system according to an embodiment of the present disclosure.

FIG. 23 schematically illustrates an inner structure of a contents server in a mobile communication system according to an embodiment of the present disclosure.

Referring to FIG. 23, a contents server 2300 includes a transmitter 2311, a controller 2313, a receiver 2315, and a storage 2317.

The controller 2313 controls the overall operation of the contents server 2300. More particularly, the controller 2313 controls the contents server 2300 to perform a media processing operation. The media processing operation is performed in the manner described with reference to FIGS. 1 to 18 and a description thereof will be omitted herein.

The transmitter 2311 transmits various signals and messages to other entities under a control of the controller 2313.

The receiver 2315 receives various signals and messages from other entities under a control of the controller 2313.

The storage 2317 stores various programs and data used for performing the media processing operation in FIGS. 1 to 18, and data which occurs while the media processing operation in FIGS. 1 to 18 is performed.

While the transmitter 2311, the controller 2313, the receiver 2315, and the storage 2317 are shown in FIG. 23 as separate units, it is to be understood that this is merely for convenience of description. In other words, two or more of the transmitter 2311, the controller 2313, the receiver 2315, and the storage 2317 may be incorporated into a single unit.

Certain aspects of the present disclosure may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet, and the like). The computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and an apparatus for processing media traffic according to an embodiment of the present disclosure may be implemented by hardware, software and/or a combination thereof. The software may be stored in a non-volatile storage, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, e.g., computer-readable, storage medium, e.g., a Compact Disk (CD), a Digital Versatile Disk (DVD), a magnetic disk, or a magnetic tape. A method and an apparatus for processing media traffic according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus for processing media traffic according to an embodiment of the present disclosure may receive the program from a program providing device which is connected to the apparatus via a wire or a wireless and store the program. The program providing device may include a memory for storing instructions which instruct to perform a contents protect method which has already been installed, information used for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

As is apparent from the foregoing description, an embodiment of the present disclosure enables to adaptively process media traffic based on network status.

An embodiment of the present disclosure enables to process media traffic based on a service provider policy thereby increasing a Quality of Experience (QoE) of a user equipment.

An embodiment of the present disclosure enables to determine a service provider policy for whether a media processing policy may be applied to media traffic detected per user equipment or application.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing media traffic by a Media Processing Function (MPF) entity in a mobile communication system, the method comprising:
installing a media policy into the MPF entity when an Internet Protocol Connectivity Access Network (IP-CAN) session between a gateway with a Traffic Detection Function (TDF) and a media policy server is established, or application traffic is detected in the gateway with the TDF;
updating the media policy according to a network status determined based on congestion information related to an evolved node B (eNB) after installing the media policy; and
performing at least one of a cache control of the media traffic, or video pacing of the media traffic for changing media traffic in the IP-CAN session based on parameters for the media processing action according to the updated media policy,
wherein the media policy comprises a Media Processing Info Attribute-Value-Pair (AVP),
wherein the Media Processing Info AVP comprises information about the media processing action, parameters of the Media Processing Info AVP, and a type of the media processing action,
wherein the Media Processing Info AVP comprises at least one of a Media Processing Indicator AVP, a Selected MPF Identifier (ID) AVP, an Application Instance Identifier AVP, or a Media Processing Action AVP, and
wherein the Media Processing Action AVP comprises information about the media processing action, and the parameters for the media processing action.

2. The method of claim 1, further comprising:
reporting a media processing usage record to the media policy server when the media processing action is completed.

3. The method of claim 1, wherein the media policy further comprises a media processing rule which is applicable based on the user equipment or contents of the application traffic.

4. The method of claim 3,
wherein the Media Processing Indicator AVP indicates whether a detected session needs a media processing,
wherein the Selected MPF ID AVP comprises an ID of a selected media processing function which a Policy and Charging Enforcement Function (PCEF) module with an Application Detection Control (ADC) function will forward, and
wherein the Application Instance Identifier AVP comprises an ID allocated by the PCEF module for accepting a correlation for a service data flow description of an application start event and an application stop event.

5. The method of claim 1, wherein the installing of the media policy comprises:
establishing an MPF session with the media policy server,
receiving information on the media policy from the media policy server, and
installing the media policy into the MPF entity.

6. The method of claim 1,
wherein the updating of the media policy based on the network status comprises:
receiving a Media Policy Change Request message which requests to change the installed media policy from the media policy server according to a change of the network status, and
updating the installed media policy based on an updated media policy comprised in the Media Policy Change Request message, and
wherein the MPF entity is located apart from the gateway with the TDF.

7. The method of claim 2, wherein the reporting of the media processing usage record to the media policy server when the media processing action is completed comprises:
detecting that a session which is established between the MPF entity and the media policy server for processing the media traffic is released, and
reporting media processing usage records which the MPF entity collects while the session is maintained to the media policy server.

8. The method of claim 7, wherein the media processing usage records comprise at least one of a traffic usage information Attribute-Value-Pair (AVP), a session information AVP, or a media processing usage information AVP.

9. The method of claim 8,
wherein the traffic usage information AVP comprises an octet count transmitted from the MPF entity to the user equipment,
wherein the session information AVP comprises at least one of session information, origin server information, a source address, a destination address, or ports, and
wherein the media processing usage information AVP comprises a type of the media processing action, and the parameters for the media processing action.

10. The method of claim 1, wherein the installing of the media policy comprises:
receiving information on the media policy from the media policy server, and
installing the media policy into the MPF entity.

11. The method of claim 1,
wherein the updating of the media policy based on the network status comprises:
receiving a Media Policy Change Request message which requests to change the installed media policy from the media policy server according to a change of the network status, and
updating the installed media policy based on an updated media policy comprised in the Media Policy Change Request message, and wherein the MPF entity is co-located with the gateway with the TDF.

12. The method of claim 2,
wherein the reporting of the media processing usage record to the media policy server when the media processing action is completed comprises:
detecting that a session which is established between the MPF entity and the media policy server for processing the media traffic is released, and
reporting media processing usage records which the MPF entity collects while the session is maintained to the media policy server, and wherein the MPF entity is co-located with the gateway with the TDF.

13. The method of claim 12, wherein the media processing usage records comprise at least one of a traffic usage information Attribute-Value-Pair (AVP), a session information AVP, or a media processing usage information AVP.

14. The method of claim 13,
wherein the traffic usage information AVP comprises an octet count transmitted from the MPF entity to the user equipment, wherein the session information AVP comprises at least one of session information, origin server information, a source address, a destination address, or ports, and wherein the media processing usage information AVP comprises a type of the media processing action, and the parameters for the media processing action.

15. The method of claim 1, wherein the installing of the media policy comprises:

receiving a Media Processing Control (MPC) profile index from the gateway with the TDF, transmitting, to the media policy server, a Media Policy message, which requests a media policy, comprising the MPC profile index, receiving information on the media policy from the media policy server, and installing the media policy into the MPF entity, and wherein the MPC profile index comprises an index for a Media Processing Info Attribute-Value-Pair (AVP), and wherein the Media Processing Info AVP comprises information about the media processing action, parameters of the Media Processing Info AVP, and a type of the media processing action.

16. The method of claim 1, wherein the updating of the media policy based on the network status comprises:

receiving a Notification of Network Status Change message which notifies a change of the network status from the gateway with the TDF according to the change of the network status, transmitting a Media Policy Change Request message which requests to change the installed media policy to the media policy server, receiving an Updated Media Policy message comprising an updated media policy from the media policy server after transmitting the Media Policy Change Request message, and updating the installed media policy based on the updated media policy comprised in the Updated Media Policy message.

17. The method of claim 1, wherein the installing of the media policy comprises:

receiving a Media Processing Control (MPC) profile index from the gateway with the TDF, transmitting, to the media policy server, a Media Policy message, which requests a media policy, comprising the MPC profile index, establishing a session with a contents server, after establishing the session with the contents server, transmitting a Complete message indicating that the session establishment with the contents server is completed to the gateway with the TDF, and after transmitting the Complete message to the gateway with the TDF, performing a Transmission Control Protocol (TCP) proxy function for an application session between the user equipment and the contents server, wherein the MPC profile index comprises an index for a Media Processing Info Attribute-Value-Pair (AVP), and wherein the Media Processing Info AVP comprises information about the media processing action, parameters of the Media Processing Info AVP, and a type of the media processing action.

18. The method of claim 1, wherein the updating of the media policy based on the network status comprises:

receiving an Updated Media Policy message comprising an updated media policy from the gateway with the TDF according to a change of the network status, and updating the installed media policy based on the updated media policy comprised in the Updated Media Policy message.

19. The method of claim 2, wherein the reporting of the media processing usage record to the media policy server when the media processing action is completed comprises:

detecting that a session which is established between the MPF entity and the media policy server for processing the media traffic is released, and reporting media processing usage records which the MPF entity collects while the session is maintained to the gateway with the TDF thereby the gateway with the TDF reports the media processing usage records which the MPF entity collects to the media policy server.

20. The method of claim 1, wherein the MPF entity is located apart from the gateway with the TDF, or the MPF entity is co-located with the gateway with the TDF.

21. A method for processing media traffic by a media policy server in a mobile communication system, the method comprising:

providing a media policy to a Media Processing Function (MPF) entity when an Internet Protocol Connectivity Access Network (IP-CAN) session between the media policy server and a gateway with a Traffic Detection Function (TDF) is established, or application traffic is detected in the gateway with the TDF; and providing an updated media policy to the MPF entity according to a network status determined based on congestion information related to an evolved node B (eNB), wherein the updated media policy is used for determining parameters for a media processing action, and the parameters for the media processing action are applied to performing the media processing action in the MPF entity for changing media traffic in the IP-CAN session, wherein the media processing action includes at least one of a cache control of the media traffic, or video pacing of the media traffic, wherein the media policy comprises a Media Processing Info Attribute-Value-Pair (AVP), wherein the Media Processing Info AVP comprises information about the media processing action, parameters of the Media Processing Info AVP, and a type of the media processing action, wherein the Media Processing Info AVP comprises at least one of a Media Processing Indicator AVP, a Selected MPF Identifier (ID) AVP, an Application Instance Identifier AVP, or a Media Processing Action AVP, and wherein the Media Processing Action AVP comprises information about the media processing action, and the parameters for the media processing action.

22. The method of claim 21, further comprising:

when the media processing action in the MPF entity is completed, receiving a media processing usage record from the MPF entity.

23. The method of claim 21, wherein the media policy further comprises a media processing rule which is applicable based on the user equipment or contents of the application traffic.

24. The method of claim 23, wherein the Media Processing Indicator AVP indicates whether a detected session needs a media processing, wherein the Selected MPF ID AVP comprises an ID of a selected media processing function which a Policy and Charging Enforcement Function (PCEF) module with an Application Detection Control (ADC) function will forward, and wherein the Application Instance Identifier AVP comprises an ID allocated by the PCEF module for accepting a correlation for a service data flow description of an application start event and an application stop event.

25. The method of claim 21, wherein the providing of the media policy comprises:
   establishing an MPF session with the MPF entity; and
   transmitting information on the media policy to the MPF entity.

26. The method of claim 21, wherein the providing the updated media policy to the MPF entity based on the network status after providing the media policy comprises:
   receiving a Notification of Network Status Change message which notifies a change of the network status from the gateway with the TDF; and
   after receiving the Notification of Network Status Change message, transmitting a Media Policy Change Request message which requests to change the media policy installed in the MPF entity to the MPF entity,
   wherein the MPF entity is located apart from the gateway with the TDF.

27. The method of claim 22, wherein the receiving of the media processing usage record from the MPF entity when the media processing action in the MPF entity is completed comprises:
   receiving media processing usage records which the MPF entity collects while the session is maintained from the MPF entity according to a release of a session which is established between the MPF entity and the media policy server for processing the media traffic.

28. The method of claim 27, wherein the media processing usage records comprises at least one of a traffic usage information Attribute-Value-Pair (AVP), a session information AVP, or a media processing usage information AVP.

29. The method of claim 28,
   wherein the traffic usage information AVP comprises an octet count transmitted from the MPF entity to a user equipment,
   wherein the session information AVP comprises at least one of session information, origin server information, a source address, a destination address, or ports, and
   wherein the media processing usage information AVP comprises a type of the media processing action.

30. The method of claim 21,
   wherein the providing of the updated media policy to the MPF entity based on the network status comprises:
   receiving a Notification of Network Status Change message which notifies a change of the network status from the gateway with the TDF, and
   transmitting a Media Policy Change Request message which requests to change the media policy installed in the MPF entity to the MPF entity after receiving the Notification of Network Status Change message,
   and wherein the MPF entity is co-located with the gateway with the TDF.

31. The method of claim 22,
   wherein the receiving the media processing usage record from the MPF entity when the media processing action in the MPF entity is completed comprises receiving media processing usage records which the MPF entity collects while the session is maintained from the MPF entity according to a release of a session which is established between the MPF entity and the media policy server for processing the media traffic, and
   wherein the MPF entity is co-located with the gateway with the TDF.

32. The method of claim 31, wherein the media processing usage records comprise at least one of a traffic usage information Attribute-Value-Pair (AVP), a session information AVP, or a media processing usage information AVP.

33. The method of claim 32,
   wherein the traffic usage information AVP comprises an octet count transmitted from the MPF entity to a user equipment,
   wherein the session information AVP comprises at least one of session information, origin server information, a source address, a destination address, or ports, and
   wherein the media processing usage information AVP comprises a type of the media processing action, and the parameters for the media processing action.

34. The method of claim 21, wherein the installing of the media policy comprises:
   transmitting a Media Processing Control (MPC) profile index to the gateway with the TDF,
   receiving, from the MPF entity, a Media Policy message, which requests a media policy, comprising the MPC profile index, and
   transmitting information on the media policy to the MPF entity,
   wherein the MPC profile index comprises an index for a Media Processing Info Attribute-Value-Pair (AVP), and
   wherein the Media Processing Info AVP comprises information about the media processing action, parameters of the Media Processing Info AVP, and a type of the media processing action.

35. The method of claim 21, wherein the providing the updated media policy to the MPF entity based on the network status after providing the media policy comprises:
   receiving a Media Policy Change Request message which requests to change the media policy installed in the MPF entity to the MPF entity according to a change of the network status, and
   after receiving the Media Policy Change Request message, transmitting an Updated Media Policy message comprising an updated media policy to the MPF entity.

36. The method of claim 21,
   wherein the providing of the media policy comprises transmitting a Media Processing Control (MPC) profile index to the gateway with the TDF thereby the gateway with the TDF transmits a Media Policy message which requests a media policy comprising the MPC profile index to the MPF entity,
   wherein the MPC profile index comprises an index for a Media Processing Info Attribute-Value-Pair (AVP), and
   wherein the Media Processing Info AVP comprises information about the media processing action, parameters of the Media Processing Info AVP, and a type of the media processing action.

37. The method of claim 21, wherein the providing of the updated media policy to the MPF entity based on the network status comprises:
   receiving a Media Policy Change Request message which requests to change the media policy from the gateway with the TDF according to a change of the network status, and
   after receiving the Media Policy Change Request message, transmitting an Updated Media Policy message comprising an updated media policy to the gateway with the TDF thereby the gateway with the TDF transmits the Updated Media Policy message comprising the updated media policy to the MPF entity.

38. The method of claim 22, wherein the receiving the media processing usage record from the MPF entity when the media processing action in the MPF entity is completed comprises:
receiving media processing usage records which the MPF entity collects while the session is maintained from the MPF entity according to a release of a session which is established between the MPF entity and the media policy server for processing the media traffic.

39. The method of claim 21,
wherein the MPF entity is located apart from the gateway with the TDF, or the MPF entity is co-located with the gateway with the TDF.

40. A Media Processing Function (MPF) entity in a mobile communication system, the MPF entity comprising:
a transmitter;
a receiver; and
a processor configured to:
install a media policy when an Internet Protocol Connectivity Access Network (IP-CAN) session between a gateway with a Traffic Detection Function (TDF) and a media policy server is established via the transmitter or the receiver, or an application is detected in the gateway with the TDF,
update the media policy according to a network status determined based on congestion information related to an evolved node B (eNB) after installing the media policy, and
perform at least one of a cache control of the media traffic, or video pacing of the media traffic for changing media traffic in the IP-CAN session based on parameters for the media processing action according to the updated media policy,
wherein the media policy comprises a Media Processing Info Attribute-Value-Pair (AVP),
wherein the Media Processing Info AVP comprises information about the media processing action, parameters of the Media Processing Info AVP, or a type of the media processing action,
wherein the Media Processing Info AVP comprises at least one of a Media Processing Indicator AVP, a Selected MPF Identifier (ID) AVP, an Application Instance Identifier AVP, or a Media Processing Action AVP, and
wherein the Media Processing Action AVP comprises information about the media processing action, and the parameters for the media processing action.

41. The MPF entity of claim 40, wherein the transmitter is further configured to report a media processing usage record to the media policy server when the media processing action is completed.

42. The MPF entity of claim 40, wherein the media policy further comprises a media processing rule which is applicable based on a user equipment or contents.

43. The MPF entity of claim 42,
wherein the Media Processing Indicator AVP indicates whether a detected session needs a media processing,
wherein the Selected MPF ID AVP comprises an ID of a selected media processing function which a Policy and Charging Enforcement Function (PCEF) module with an Application Detection Control (ADC) function will forward, and
wherein the Application Instance Identifier AVP comprises an ID allocated by the PCEF module for accepting a correlation for a service data flow description of an application start event and an application stop event.

44. The MPF entity of claim 40,
wherein the transmitter and the receiver are configured to establish an MPF session with the media policy server,
wherein the receiver is configured to receive the media policy from the media policy server, and
wherein the processor is further configured to install the received media policy.

45. The MPF entity of claim 40,
wherein the receiver is configured to receive a Media Policy Change Request message which requests to change the installed media policy from the media policy server according to a change of the network status,
wherein the processor is further configured to update the installed media policy based on an updated media policy comprised in the Media Policy Change Request message, and
wherein the MPF entity is located apart from the gateway with the TDF.

46. The MPF entity of claim 41,
wherein the processor is further configured to detect that a session which is established between the MPF entity and the media policy server for processing the media traffic is released, and
wherein the transmitter is further configured to report media processing usage records which the MPF entity collects while the session is maintained to the media policy server.

47. The MPF entity of claim 46, wherein the media processing usage records comprise at least one of traffic usage information Attribute-Value-Pair (AVP), a session information AVP, or a media processing usage information AVP.

48. The MPF entity of claim 47,
wherein the traffic usage information AVP comprises an octet count transmitted from the MPF entity to the user equipment,
wherein the session information AVP comprises at least one of session information, origin server information, a source address, a destination address, or ports, and
wherein the media processing usage information AVP comprises a type of a media processing action, and the parameters for the media processing action.

49. The MPF entity of claim 40,
wherein the receiver is configured to receive the media policy from the media policy server, and
wherein the processor is further configured to install the received media policy.

50. The MPF entity of claim 40,
wherein the receiver is configured to receive a Media Policy Change Request message which requests to change the installed media policy from the media policy server according to a change of the network status,
wherein the processor is further configured to update the installed media policy based on an updated media policy comprised in the Media Policy Change Request message, and
wherein the MPF entity is co-located with the gateway with the TDF.

51. The MPF entity of claim 41,
wherein the processor is further configured to detect that a session which is established between the MPF entity and the media policy server for processing the media traffic is released, wherein the transmitter is further configured to report media processing usage records which the MPF entity collects while the session is maintained to the media policy server, and wherein the MPF entity is co-located with the gateway with the TDF.

52. The MPF entity of claim 51, wherein the media processing usage records comprise at least one of a traffic usage information Attribute-Value-Pair (AVP), a session information AVP, or a media processing usage information AVP.

53. The MPF entity of claim 52, wherein the traffic usage information AVP comprises an octet count transmitted from the MPF entity to a user equipment, wherein the session information AVP comprises at least one of session information, origin server information, a source address, a destination address, or ports, and wherein the media processing usage information AVP comprises a type of a media processing action, and the parameters for the media processing action.

54. The MPF entity of claim 40, wherein the receiver is configured to receive a Media Processing Control (MPC) profile index from the gateway with the TDF, wherein the transmitter is configured to transmit, to the media policy server, a Media Policy message, which requests a media policy, comprising the MPC profile index, wherein the receiver is further configured to receive the media policy from the media policy server, wherein the processor is further configured to install the received media policy, wherein the MPC profile index comprises an index for a Media Processing Info Attribute-Value-Pair (AVP), and wherein the Media Processing Info AVP comprises information about the media processing action, parameters of the Media Processing Info AVP, and a type of the media processing action.

55. The MPF entity of claim 40, wherein the receiver is configured to receive a Notification of Network Status Change message which notifies a change of the network status from the gateway with the TDF according to a change of the network status, wherein the transmitter is configured to transmit a Media Policy Change Request message which requests to change the installed media policy to the media policy server, wherein the receiver is further configured to receive an Updated Media Policy message comprising an updated media policy from the media policy server after transmitting the Media Policy Change Request message, and wherein the processor is further configured to update the installed media policy based on the updated media policy comprised in the Updated Media Policy message.

56. The MPF entity of claim 40, wherein the receiver is configured to receive a Media Processing Control (MPC) profile index from the gateway with the TDF, wherein the transmitter is configured to transmit, to the media policy server, a Media Policy message, which requests a media policy, comprising the MPC profile index, wherein the processor is further configured to establish a session with a contents server, wherein the transmitter is further configured to transmit a Complete message indicating that a session establishment with the contents server is completed to the gateway with the TDF after the processor establishes the session with the contents server, wherein the processor is further configured to perform a Transmission Control Protocol (TCP) proxy function for an application session between a user equipment and the contents server after the transmitter transmits the Complete message to the gateway with the TDF, wherein the MPC profile index comprises an index for a Media Processing Info Attribute-Value-Pair (AVP), and wherein the Media Processing Info AVP comprises information about the media processing action, parameters of the Media Processing Info AVP, and a type of the media processing action.

57. The MPF entity of claim 40, wherein the receiver is configured to receive an Updated Media Policy message comprising an updated media policy from the gateway with the TDF according to a change of the network status, and wherein the processor is further configured to update the installed media policy based on the updated media policy comprised in the Updated Media Policy message.

58. The MPF entity of claim 41, wherein the processor is further configured to detect that a session which is established between the MPF entity and the media policy server for processing the media traffic is released, and wherein the transmitter is further configured to report media processing usage records which the MPF entity collects while the session is maintained to the gateway with the TDF thereby the gateway with the TDF reports the media processing usage records which the MPF entity collects to the media policy server.

59. The MPF entity of claim 40, wherein the MPF entity is located apart from the gateway with the TDF, or the MPF entity is co-located with the gateway with the TDF.

60. A media policy server in a mobile communication system, the media policy server comprising:

a transmitter configured to:

provide a media policy to a Media Processing Function (MPF) entity when an Internet Protocol Connectivity Access Network (IP-CAN) session between the media policy server and a gateway with a Traffic Detection Function (TDF) is established, or an application is detected in the gateway with the TDF, and provide an updated media policy and updated parameters for a media processing action to the MPF entity according to a network status determined based on congestion information related to an evolved node B (eNB), wherein the updated media policy is used for determining parameters for the media processing action, and the parameters for the media processing action are applied to perform the media processing action in the MPF entity changing media traffic in the IP-CAN session, wherein the media processing action includes at least one of a cache control of the media traffic, or video pacing of the media traffic, wherein the media policy comprises a Media Processing Info Attribute-Value-Pair (AVP), wherein the Media Processing Info AVP comprises information about the media processing action, parameters of the Media Processing Info AVP, and a type of the media processing action, wherein the Media Processing Info AVP comprises at least one of a Media Processing Indicator AVP, a Selected MPF Identifier (ID) AVP, an Application Instance Identifier AVP, or a Media Processing Action AVP, and wherein the Media Processing Action AVP comprises information about the media processing action, and the parameters for the media processing action.

61. The media policy server of claim 60, further comprising:
a receiver configured to receive a media processing usage record from the MPF entity when the media processing action based on the media policy in the MPF entity is completed.

62. The media policy server of claim 60, wherein the media policy further comprises a media processing rule which is applicable based on a user equipment or contents.

63. The media policy server of claim 62,
wherein the Media Processing Indicator AVP indicates whether a detected session needs a media processing,
wherein the Selected MPF ID AVP comprises an ID of a selected media processing function which a Policy and Charging Enforcement Function (PCEF) module with an Application Detection Control (ADC) function will forward, and
wherein the Application Instance Identifier AVP comprises an ID allocated by the PCEF module for accepting a correlation for a service data flow description of an application start event and an application stop event.

64. The media policy server of claim 60, further comprising:
a receiver,
wherein the transmitter and the receiver are configured to establish an MPF session with the MPF entity, and
wherein the transmitter is further configured to transmit the media policy to the MPF entity.

65. The media policy server of claim 60, further comprising:
a receiver configured to receive a Notification of Network Status Change message which notifies a change of the network status from the gateway with the TDF,
wherein the transmitter is further configured to transmit a Media Policy Change Request message which requests to change the media policy installed in the MPF entity to the MPF entity after the receiver receives the Notification of Network Status Change message, and
wherein the MPF entity is located apart from the gateway with the TDF.

66. The media policy server of claim 61, wherein the receiver is further configured to receive media processing usage records which the MPF entity collects while the session is maintained from the MPF entity according to a release of a session which is established between the MPF entity and the media policy server for processing the media traffic.

67. The media policy server of claim 66, wherein the media processing usage records comprise at least one of traffic usage information Attribute-Value-Pair (AVP), a session information AVP, or a media processing usage information AVP.

68. The media policy server of claim 67,
wherein the traffic usage information AVP comprises an octet count transmitted from the MPF entity to a user equipment,
wherein the session information AVP comprises at least one of session information, origin server information, a source address, a destination address, or ports, and wherein the media processing usage information AVP comprises a type of the media processing action, and the parameters for the media processing action.

69. The media policy server of claim 60, further comprising:
a receiver configured to receive a Notification of Network Status Change message which notifies a change of the network status from the gateway with the TDF,
wherein the transmitter is further configured to transmit a Media Policy Change Request message which requests to change the media policy installed in the MPF entity to the MPF entity after receiving the Notification of Network Status Change message, and
wherein the MPF entity is co-located with the gateway with the TDF.

70. The media policy server of claim 61,
wherein the receiver is further configured to receive media processing usage records which the MPF entity collects while the session is maintained from the MPF entity according to a release of a session which is established between the MPF entity and the media policy server for processing the media traffic, and
wherein the MPF entity is co-located with the gateway with the TDF.

71. The media policy server of claim 70, wherein the media processing usage records comprise at least one of a traffic usage information Attribute-Value-Pair (AVP), a session information AVP, or a media processing usage information AVP.

72. The media policy server of claim 71,
wherein the traffic usage information AVP comprises an octet count transmitted from the MPF entity to a user equipment,
wherein the session information AVP comprises at least one of session information, origin server information, a source address, a destination address, or ports, and
wherein the media processing usage information AVP comprises a type of the media processing action, and the parameters for the media processing action.

73. The media policy server of claim 60, further comprising:
a receiver,
wherein the transmitter transmits a Media Processing Control (MPC) profile index to the gateway with the TDF,
wherein the receiver is further configured to receive, from the MPF entity, a Media Policy message, which requests a media policy, comprising the MPC profile index,
wherein the transmitter is further configured to transmit the media policy to the MPF entity,
wherein the MPC profile index comprises an index for a Media Processing Info Attribute-Value-Pair (AVP), and
wherein the Media Processing Info AVP comprises information about the media processing action, parameters of the Media Processing Info AVP, and a type of the media processing action.

74. The media policy server of claim 60, further comprising:
a receiver configured to receive a Media Policy Change Request message which requests to change the media policy installed in the MPF entity to the MPF entity according to a change of the network status,
wherein the transmitter is further configured to transmit an Updated Media Policy message comprising an updated media policy to the MPF entity after the receiver receives the Media Policy Change Request message.

75. The media policy server of claim 60,
wherein the transmitter is further configured to transmit a Media Processing Control (MPC) profile index to the gateway with the TDF thereby the gateway with the TDF transmits a Media Policy message which requests a media policy comprising the MPC profile index to the MPF entity,
wherein the MPC profile index comprises an index for a Media Processing Info Attribute-Value-Pair (AVP), and
wherein the Media Processing Info AVP comprises information about the media processing action, parameters of the Media Processing Info AVP, and a type of the media processing action.

76. The media policy server of claim 60, further comprising:
a receiver configured to receive a Media Policy Change Request message which requests to change the media policy from the gateway with the TDF according to a change of the network status,
wherein the transmitter is further configured to transmit an Updated Media Policy message comprising an updated media policy to the gateway with the TDF thereby the gateway with the TDF transmits the Updated Media Policy message comprising the updated media policy to the MPF entity after receiving the Media Policy Change Request message.

77. The media policy server of claim 61, wherein the receiver is further configured to receive media processing usage records which the MPF entity collects while the session is maintained from the MPF entity according to a release of a session which is established between the MPF entity and the media policy server for processing the media traffic.

78. The media policy server of claim 60,
wherein the MPF entity is located apart from the gateway with the TDF, or the MPF entity is co-located with the gateway with the TDF.

\* \* \* \* \*